(12) United States Patent
Jeong et al.

(10) Patent No.: US 11,328,432 B2
(45) Date of Patent: May 10, 2022

(54) ELECTRONIC CIRCUIT AND ELECTRONIC DEVICE PERFORMING MOTION ESTIMATION BASED ON DECREASED NUMBER OF CANDIDATE BLOCKS

(71) Applicant: SAMSUNG ELECTRONICS CO., LTD., Suwon-si (KR)

(72) Inventors: Yowon Jeong, Anyang-si (KR); Giwon Kim, Seongnam-si (KR); Wonseop Song, Seoul (KR); Jeehoon An, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 16/550,194

(22) Filed: Aug. 24, 2019

(65) Prior Publication Data

US 2020/0193618 A1    Jun. 18, 2020

(30) Foreign Application Priority Data

Dec. 18, 2018 (KR) .......................... 10-2018-0164422

(51) Int. Cl.
   *G06T 7/223* (2017.01)
   *G06T 7/246* (2017.01)
(52) U.S. Cl.
   CPC .............. *G06T 7/223* (2017.01); *G06T 7/246* (2017.01)
(58) Field of Classification Search
   CPC ......... G06T 7/223; G06T 7/246; G06T 7/231; H04N 19/56; H04N 19/51
   See application file for complete search history.

(56) References Cited

U.S. PATENT DOCUMENTS

| 5,151,784 | A  | * | 9/1992 | Lavagetto | .............. | H04N 19/61 |
| | | | | | | 375/240.12 |
| 8,265,160 | B2 | | 9/2012 | Al-Kadi et al. | | |
| 8,736,767 | B2 | | 5/2014 | Van Beek | | |
| 8,824,558 | B2 | | 9/2014 | Lin et al. | | |
| 11,089,261 | B2 | * | 8/2021 | Diggins | ................... | G06T 5/30 |

(Continued)

FOREIGN PATENT DOCUMENTS

| AU | 2002313384 B2 | * | 7/2005 | | |
| EP | 1019871 B1 | * | 8/2002 | ............. | H04N 19/56 |
| WO | WO-03032628 A1 | * | 4/2003 | ............. | G06T 7/269 |

*Primary Examiner* — Charles T Shedrick
(74) *Attorney, Agent, or Firm* — Volentine, Whitt & Francos, PLLC

(57) ABSTRACT

An electronic circuit includes a block determinator, a candidate selector, and a motion vector generator to perform motion estimation between images. The block determinator determines a current block corresponding to a current location on an image and candidate blocks corresponding to relative locations with respect to the current location for each recursion for blocks constituting the image. The candidate selector selects some of the candidate blocks. The motion vector generator generates a motion vector for the current block based on one reference patch which is determined from reference patches indicated by candidate motion vectors of the selected candidate blocks. At least one of the relative locations corresponding to the candidate blocks selected in a first recursion is different from each of the relative locations corresponding to the candidate blocks selected in a second recursion following the first recursion.

20 Claims, 25 Drawing Sheets

(56) References Cited

U.S. PATENT DOCUMENTS

| | | | |
|---|---|---|---|
| 2003/0081682 A1* | 5/2003 | Lunter | G06T 7/223 |
| | | | 375/240.16 |
| 2004/0114688 A1* | 6/2004 | Kang | H04N 19/53 |
| | | | 375/240.12 |
| 2011/0255596 A1 | 10/2011 | Chen et al. | |
| 2016/0021386 A1 | 1/2016 | Fishwick | |
| 2017/0208341 A1* | 7/2017 | Kulakov | H04N 19/533 |
| 2018/0098088 A1 | 4/2018 | Chuang et al. | |
| 2018/0199052 A1 | 7/2018 | He | |
| 2019/0188829 A1* | 6/2019 | Wei | H04N 19/55 |
| 2020/0195964 A1* | 6/2020 | Jeong | H04N 5/144 |
| 2021/0203980 A1* | 7/2021 | Esenlik | H04N 19/176 |

* cited by examiner

Reference Patch indicated by Best Candidate Motion Vector

Search Range

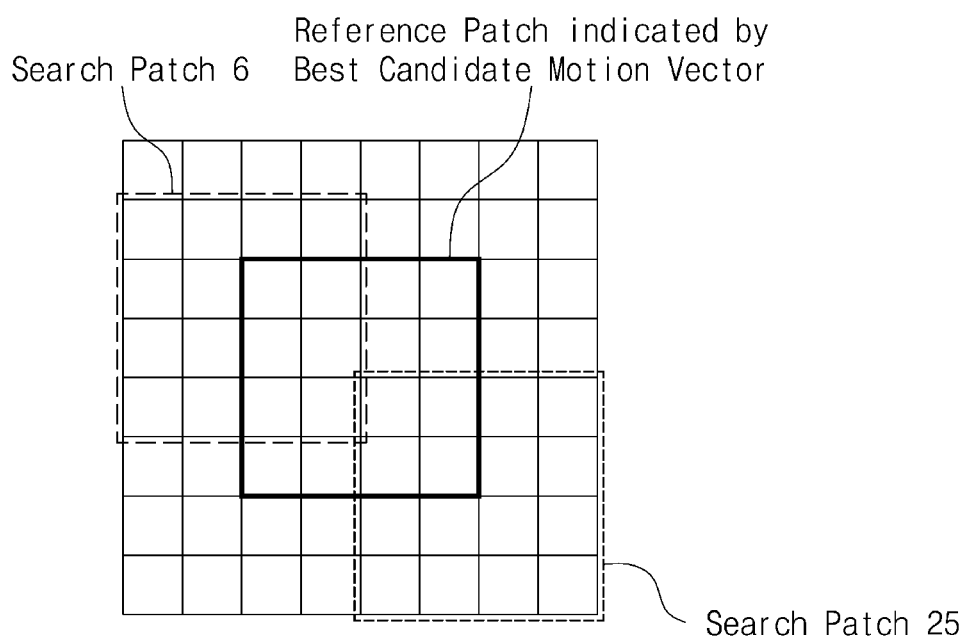

ELECTRONIC CIRCUIT AND ELECTRONIC DEVICE PERFORMING MOTION ESTIMATION BASED ON DECREASED NUMBER OF CANDIDATE BLOCKS

CROSS-REFERENCE TO RELATED APPLICATION

This application claims priority under 35 U.S.C. § 119 to Korean Patent Application No. 10-2018-0164422 filed on Dec. 18, 2018, in the Korean Intellectual Property Office, the disclosure of which is incorporated herein by reference in its entirety.

TECHNICAL FIELD

The present disclosure relates to an electronic circuit and an electronic device, and more particularly, relates to a circuit and a device for motion estimation of image or video processing.

DESCRIPTION OF RELATED ART

Nowadays, various types of electronic devices are being used. An electronic device performs its own functions depending on operations of electronic components (e.g., devices and circuits) included in the electronic device.

Most of electronic devices which are being used nowadays include components which are capable of generating and outputting information of an image and/or a video. For example, a camera device may capture an object to generate data of a still image and/or a moving image, and a display device may output image information visually recognized based on data.

Meanwhile, as a demand on information of more vivid image and video increases, an amount of data for displaying an image and a video is gradually increasing, and various techniques for processing an image and a video are being developed. However, when a large amount of data is to be processed, a long time may be taken to read data from a memory and to process the read data. In this case, a speed of data processing may be degraded, and a large amount of power may be consumed to process data.

SUMMARY

Example embodiments of the present disclosure may decrease an amount of data referenced for motion estimation, without degradation of accuracy of the motion estimation or with minimized degradation of accuracy of the motion estimation. In example embodiments, the motion estimation may be performed based on a decreased number of candidate blocks.

In some example embodiments, an electronic circuit may perform motion estimation between images, and may include a block determinator, a candidate selector, and a motion vector generator. The block determinator may determine a current block corresponding to a current location on an image and candidate blocks corresponding to relative locations with respect to the current location, for each recursion for blocks constituting the image. The candidate selector may select some of the candidate blocks. The motion vector generator may generate a motion vector for the current block based on one reference patch which is determined from reference patches indicated by candidate motion vectors of the selected candidate blocks.

The electronic circuit may refer to the candidate blocks such that the relative locations corresponding to the candidate blocks which are referenced in each recursion for the blocks constituting the image are alternately selected from all relative locations corresponding to all candidate blocks which are referenced during all recursions for the blocks constituting the image. The first number of the relative locations corresponding to the candidate blocks which are referenced in each recursion for the blocks constituting the image may be less than the second number of all relative locations.

For each recursion for the blocks constituting the image, at least one of the relative locations corresponding to the candidate blocks may change. For example, at least one of the relative locations corresponding to the candidate blocks selected in a first recursion among recursions for the blocks constituting the image may be different from each of the relative locations corresponding to the candidate blocks selected in a second recursion following the first recursion.

According to example embodiments, as an amount of data referenced in motion estimation decreases, a speed of the motion estimation may be improved, and power consumption may be reduced.

BRIEF DESCRIPTION OF THE DRAWINGS

The above and other objects and features of the present disclosure will become apparent by describing in detail example embodiments thereof with reference to the accompanying drawings.

FIG. 7 and FIGS. 8A to 8C are conceptual diagrams for describing a full search for motion estimation.

DETAILED DESCRIPTION

Below, some example embodiments will be described in detail and clearly with reference to the accompanying drawings such that those skilled in the art easily can implement the present disclosure.

Figure 1:
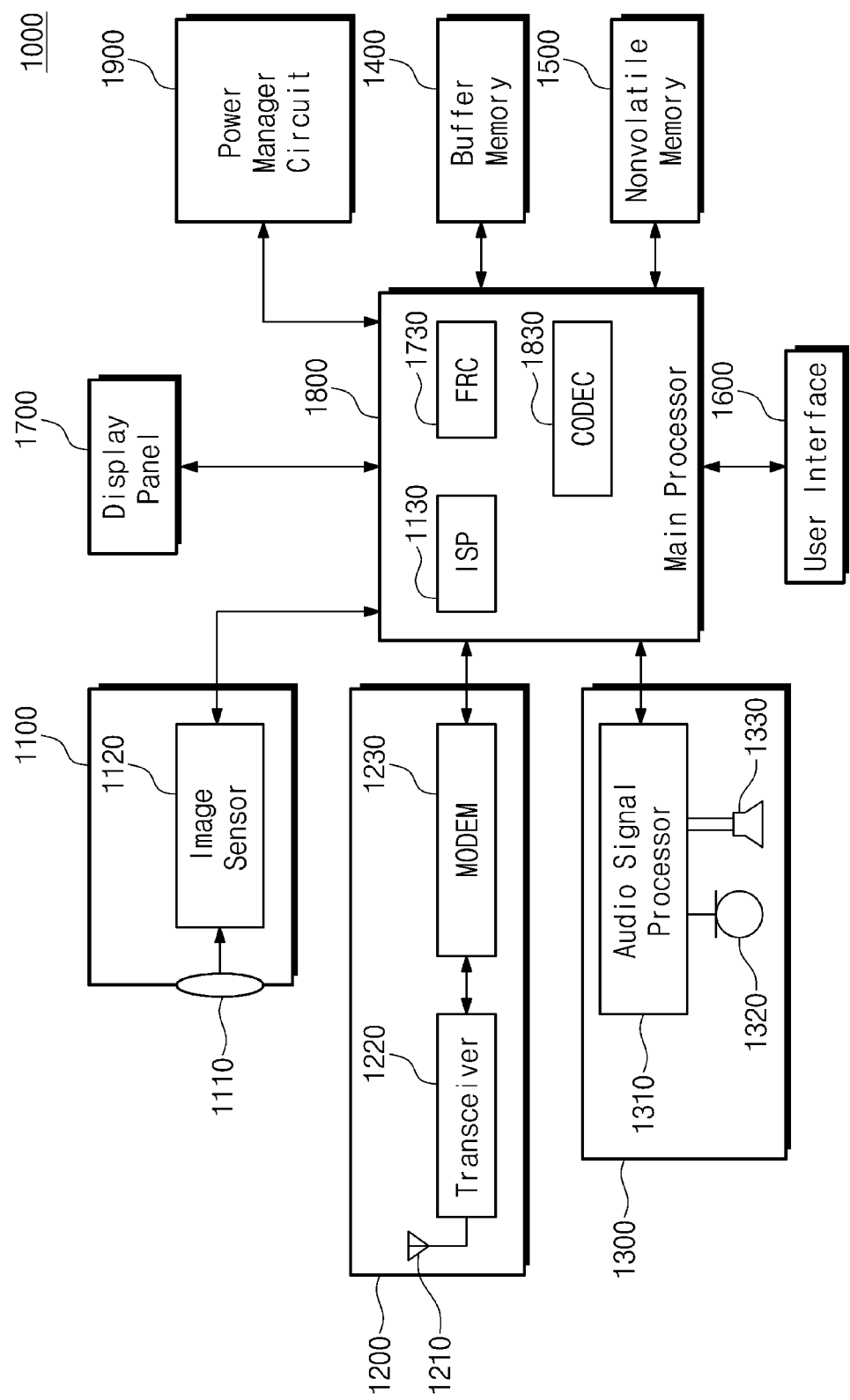
FIG. 1 is a block diagram illustrating an example configuration of an electronic device which may include an electronic circuit according to some example embodiments.

FIG. 1 is a block diagram illustrating an example configuration of an electronic device 1000 which may include an electronic circuit according to some example embodiments.

For example, the electronic device 1000 may be implemented in one of various types of electronic devices such as a desktop computer, a tablet computer, a laptop computer, a smart phone, a wearable device, a digital camera, a display device, a workstation, a server, an electric vehicle, a home appliance, a medical device, and/or the like.

The electronic device 1000 may include various electronic circuits and devices. For example, the electronic device 1000 may include an image processing block 1100, a communication block 1200, an audio processing block 1300, a buffer memory 1400, a nonvolatile memory 1500, a user interface 1600, a display panel 1700, a main processor 1800, and a power manager circuit 1900.

The image processing block 1100 may receive light through a lens 1110. An image sensor 1120 of the image processing block 1100 may generate an image signal associated with an external object, based on the received light. The image signal may describe a still image and/or a moving image for the external object. For example, the still image may provide a picture and the moving image may provide a video.

The communication block 1200 may exchange signals with an external device/system through an antenna 1210. A transceiver 1220 and a modulator/demodulator (MODEM) 1230 of the communication block 1200 may process signals exchanged with the external device/system, in compliance with one or more of various wired/wireless communication protocols.

The audio processing block 1300 may process sound information by using an audio signal processor 1310. The audio processing block 1300 may receive an audio input through a microphone 1320 and/or may output an audio through a speaker 1330.

The buffer memory 1400 may store data used for an operation of the electronic device 1000. For example, the buffer memory 1400 may temporarily store data processed or to be processed by the main processor 1800. For example, the buffer memory 1400 may include a volatile memory (such as a static random-access memory (SRAM), a dynamic RAM (DRAM), a synchronous DRAM (SDRAM), and/or the like) and/or a nonvolatile memory (such as a phase-change RAM (PRAM), a magneto-resistive RAM (MRAM), a resistive RAM (ReRAM), a ferroelectric RAM (FRAM), and/or the like).

The nonvolatile memory 1500 may store data irrespective of whether power is supplied. For example, the nonvolatile memory 1500 may include at least one of various nonvolatile memories such as a flash memory, a PRAM, an MRAM, a ReRAM, an FRAM, and/or the like. For example, the nonvolatile memory 1500 may include a removable memory such as a secure digital (SD) card or a solid-state drive (SSD), and/or an embedded memory such as an embedded multimedia card (eMMC).

The user interface 1600 may arbitrate in communication between a user and the electronic device 1000. For example, the user interface 1600 may include an input interface for receiving an input from the user and an output interface for providing information to the user.

The display panel 1700 may provide visual information to the user. For example, the display panel 1700 may display a still image and/or a moving image based on image data. For example, the display panel 1700 may be implemented in a liquid crystal display (LCD), a light emitting diode (LED) display, an organic LED (OLED) display, an active matrix OLED (AMOLED) display, and/or the like.

The main processor 1800 may control overall operations of components of the electronic device 1000. The main processor 1800 may process various operations to operate the electronic device 1000. For example, the main processor 1800 may be implemented in a general-purpose processor, a special-purpose processor, an application processor, a microprocessor, and/or the like, and may include one or more processor cores.

For example, the buffer memory 1400 and/or the nonvolatile memory 1500 may store instructions which are executable by one or more processors (e.g., the main processor 1800). The instructions may be provided based on a program code of software and/or firmware. For example, when the instructions are executed by the main processor 1800, the instructions may cause the main processor 1800 to perform operations described in the present disclosure.

In some example embodiments, the main processor 1800 may include an image signal processor (ISP) 1130, a frame rate converter (FRC) 1730, and an encoder/decoder (CODEC) 1830.

The ISP 1130 may perform various signal processing on an image signal which is generated by the image sensor 1120. For example, the ISP 1130 may perform image signal processing, such as demosaicing, digital image stabilization, noise reduction, edge enhancement, and/or the like, to output image data which suitably describes an external object. For example, the image data may be stored in the buffer memory 1400 and/or the nonvolatile memory 1500, and visual information based on the image data may be displayed on the display panel 1700.

The CODEC 1830 may encode and decode the image data. For example, the CODEC 1830 may perform encoding to reduce an amount of image data generated by the ISP 1130 (e.g., to compress the image data). For example, the CODEC 1830 may decode the encoded image data and visual information based on the decoded image data may be output on the display panel 1700.

The FRC 1730 may adjust a frame rate associated with a frequency of the image data. For example, the FRC 1730 may operate between the ISP 1130 and the CODEC 1830 and/or may operate between the CODEC 1830 and the display panel 1700. For example, the FRC 1730 may convert a frame rate of the image data generated by the ISP 1130 to be suitable for a format of the image data.

For example, when the display panel 1700 displays visual information based on the image data decoded by the CODEC 1830, the FRC 1730 may convert a frame rate of the image data to be suitable for an operation characteristic of the display panel 1700. For example, when a frame rate of the image data describing the video information is lower than a frame rate of the display panel 1700, the FRC 1730 may insert an intermediate frame between video frames to increase a frame rate.

FIG. 1 illustrates that the ISP 1130, the FRC 1730, and the CODEC 1830 are included in the main processor 1800. However, FIG. 1 is provided to facilitate better understanding and is not intended to limit the present disclosure. In some example embodiments, the main processor 1800 may include an application processor and the application processor, the ISP 1130, the FRC 1730, and the CODEC 1830 may be implemented in one system-on-chip (SoC).

Alternatively, at least one of the ISP 1130, the FRC 1730, and/or the CODEC 1830 may be provided outside the main processor 1800. For example, the ISP 1130 may be implemented in one chip together with the image sensor 1120 in the image processing block 1100 and the FRC 1730 may be implemented within one display device together with the display panel 1700. Alternatively, at least one of the ISP 1130, the FRC 1730, and/or the CODEC 1830 may be implemented in an independent intellectual property (IP) which is separate from other components.

The ISP 1130, the FRC 1730, and the CODEC 1830 may be implemented in hardware circuits (e.g., analog circuits, logic circuits, and/or the like) configured to perform operations described in the present disclosure. Alternatively, the ISP 1130, the FRC 1730, and the CODEC 1830 may be implemented in a program code of software and/or firmware and one or more processors (e.g., the main processor 1800) may execute instructions of the program code to provide operations of the ISP 1130, the FRC 1730, and the CODEC 1830. In some cases, each of the ISP 1130, the FRC 1730, and the CODEC 1830 may be implemented in a form of combination (or hybrid) of hardware and software.

In some example embodiments, each of the ISP 1130, the FRC 1730, and the CODEC 1830 may accompany motion estimation. The motion estimation performed in the electronic device 1000 will be described with reference to FIGS. 2 to 19.

The power manager circuit 1900 may supply power which is used to operate the electronic device 1000. The power management circuit 1900 may generate power which is suitable to operate components of the electronic device 1000, by suitably converting power provided from a battery and/or an external power source.

Figure 2:
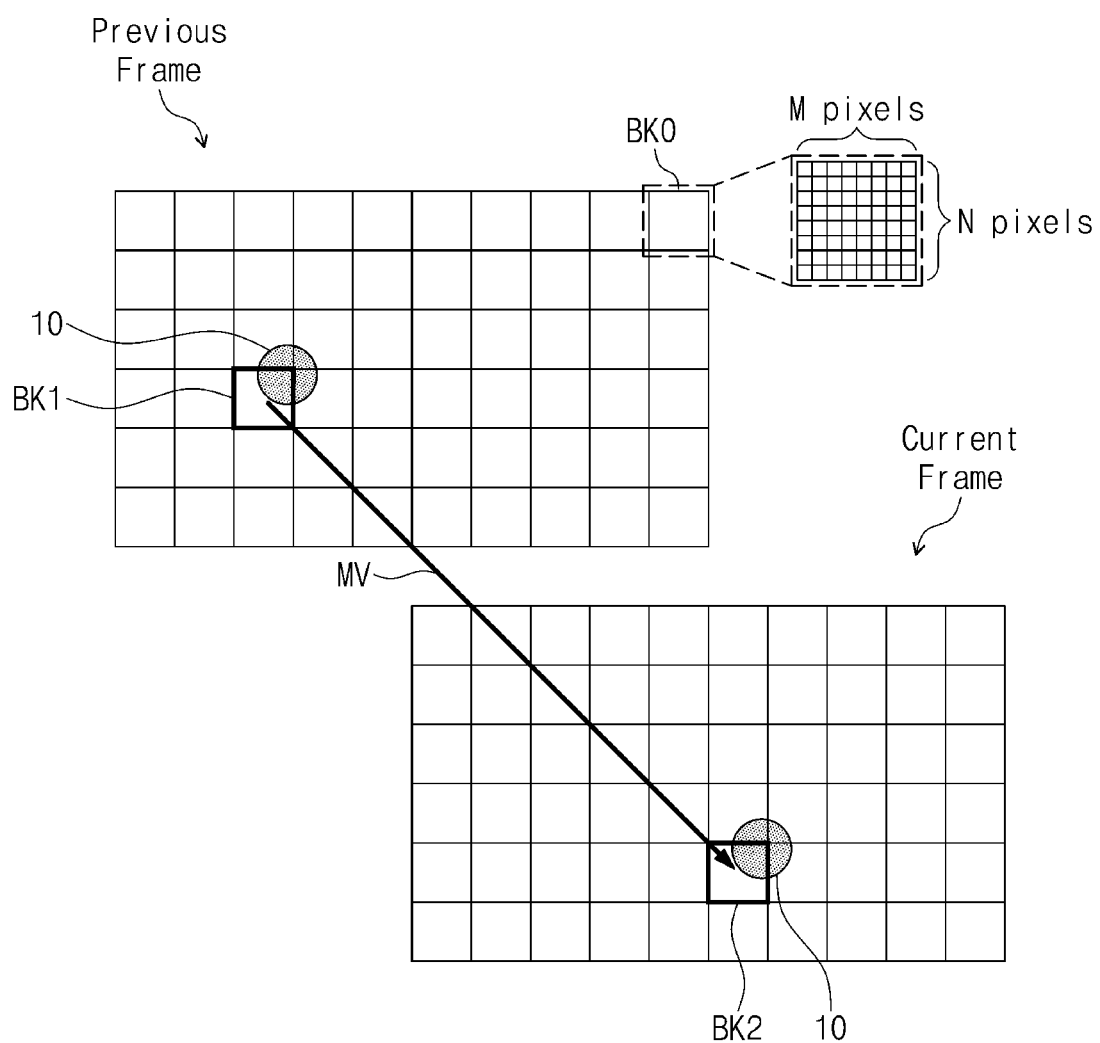
FIG. 2 is a conceptual diagram for describing motion estimation performed in an electronic device of FIG. 1.
Figure 3A:
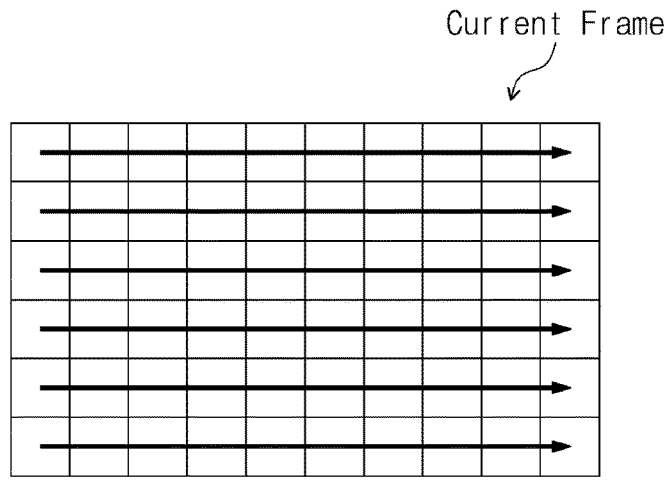
FIGS. 3A to 3C are conceptual diagrams for describing recursions for blocks constituting an image with regard to motion estimation.
Figure 3B:
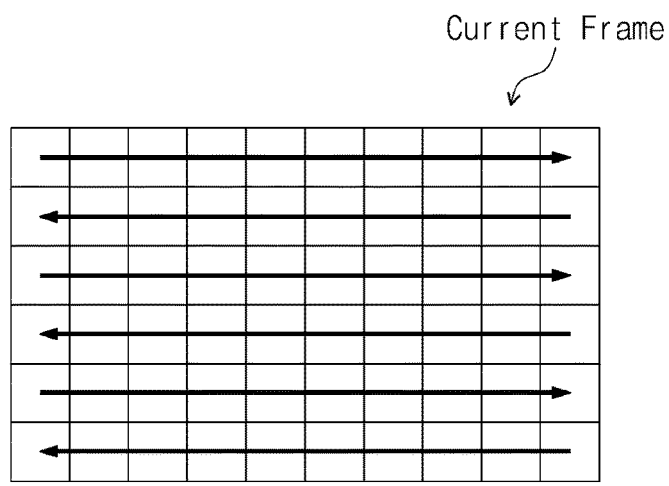
Figure 3C:
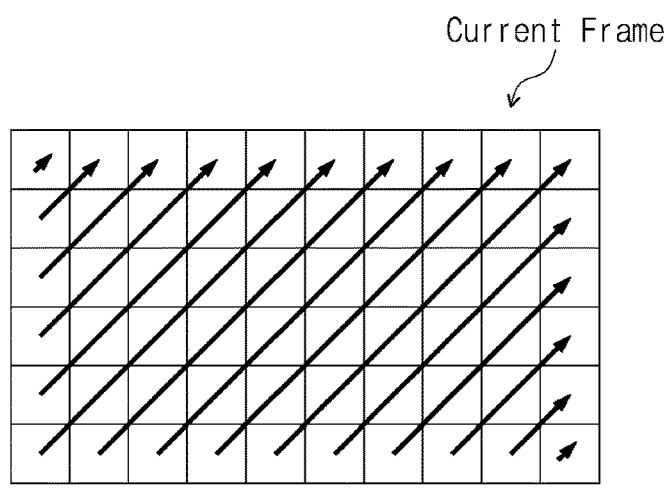

FIG. 2 is a conceptual diagram for describing motion estimation performed in the electronic device 1000 of FIG. 1. FIGS. 3A to 3C are conceptual diagrams for describing recursion for blocks constituting an image with regard to motion estimation.

Referring to FIG. 2, the motion estimation may be performed to estimate a motion of an object between images. For example, the motion estimation may be performed between an image provided as a current frame and an image provided as a previous frame. For the motion estimation, the buffer memory 1400 and/or the nonvolatile memory 1500 may store data of the image of the current frame and data of the image of the previous frame.

For example, to perform the motion estimation, an image of each frame may be divided into blocks (e.g., macroblocks). In this regard, it may be understood that the divided blocks constitute the image. Each block may be arranged to correspond to a location indicated by a coordinate on the image.

One block may be divided to include a plurality of pixels constituting the image. For example, a block BK0 may be divided such that M×N pixels constitute the block BK0 (M and N being a positive integer). A size of each block may be variously changed or modified to be suitable for the motion estimation.

For example, it may be intended to estimate a motion of an object 10 in the motion estimation. With regard to the current frame, the object 10 may be displayed at a location which corresponds to a block BK2. On the other hand, with regard to the previous frame, the object 10 may be displayed at a location which corresponds to a block BK1. In this case, the motion estimation may obtain a motion vector MV from the block BK1 with regard to the motion of the object 10.

A motion vector may be an element indicating a change of a location of a block between the image of the current frame and the image of the previous frame. For example, the motion vector MV of FIG. 2 may be applied to the block BK2 of the current frame and may be associated with the motion of the object 10 or a location change between the block BK1 and the block BK2.

The motion estimation may be performed to generate motion vectors for all blocks constituting the image of the current frame. An operation of generating a motion vector may be recursively performed on the blocks constituting the image. The recursions may be performed according to an order following blocks.

For example, referring to FIGS. 3A and 3B, an operation of generating a motion vector may be recursively performed on blocks constituting one row and then may be recursively continued on blocks constituting another row. Referring to FIG. 3A, an operation of generating a motion vector may progress in the same direction at adjacent rows. Alternatively, referring to FIG. 3B, an operation of generating a motion vector may progress in opposite directions at adjacent rows. Alternatively, referring to FIG. 3C, an operation of generating a motion vector may be recursively performed along blocks of a diagonal direction.

However, the orders of FIGS. 3A to 3C are provided to facilitate better understanding and the present disclosure is not limited to the orders of FIGS. 3A to 3C. An order of blocks associated with an operation of generating a motion vector may be variously changed or modified to be suitable for the motion estimation. However, to facilitate better understanding in the following descriptions, it will be assumed that the motion estimation is based on the order illustrated in FIG. 3A.

The motion estimation may be employed in the ISP 1130, the FRC 1730, and the CODEC 1830. For example, with regard to digital signal stabilization or temporal noise reduction, the ISP 1130 may employ the motion estimation to distinguish an intended image component from an unintended noise component. For example, the FRC 1730 may employ the motion estimation to generate an intermediate frame where a motion of an object is suitably applied between a previous frame and a next frame. For example, the CODEC 1830 may employ the motion estimation to compress image data based on a location change of a block. Besides, the motion estimation may be variously employed for image processing and video processing.

Accordingly, performing the motion estimation accurately and efficiently may be helpful to improve quality of image processing and video processing. In this regard, true motion estimation for estimating a motion which is close to a motion perceivable by a person may be more advantageous to improve quality of image processing and video processing and may make user satisfaction high. Example embodiments to be described below may facilitate accurate and efficient true motion estimation.

Figure 4:
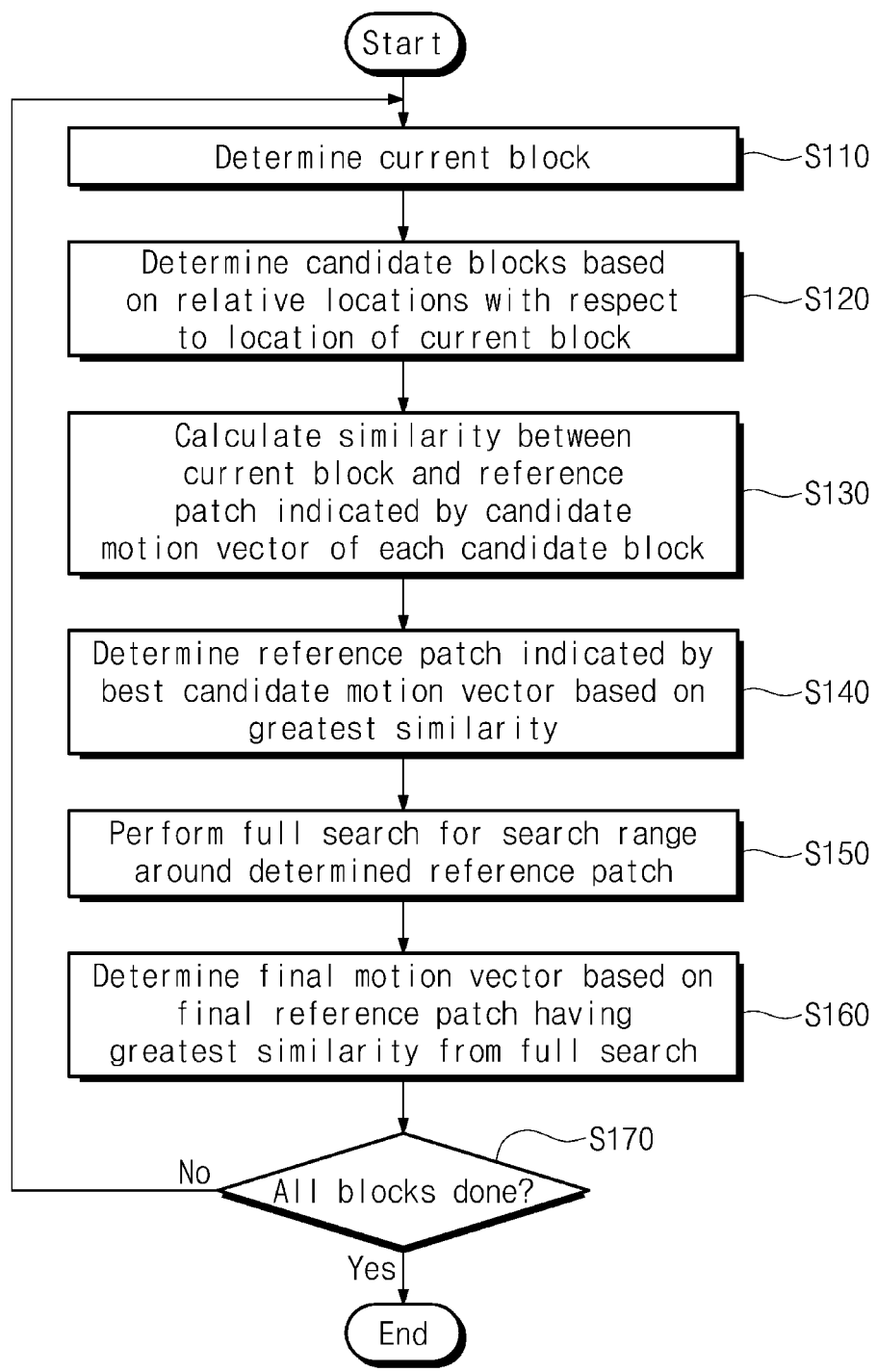
FIG. 4 is a flowchart describing example operations for performing motion estimation.
Figure 5A:
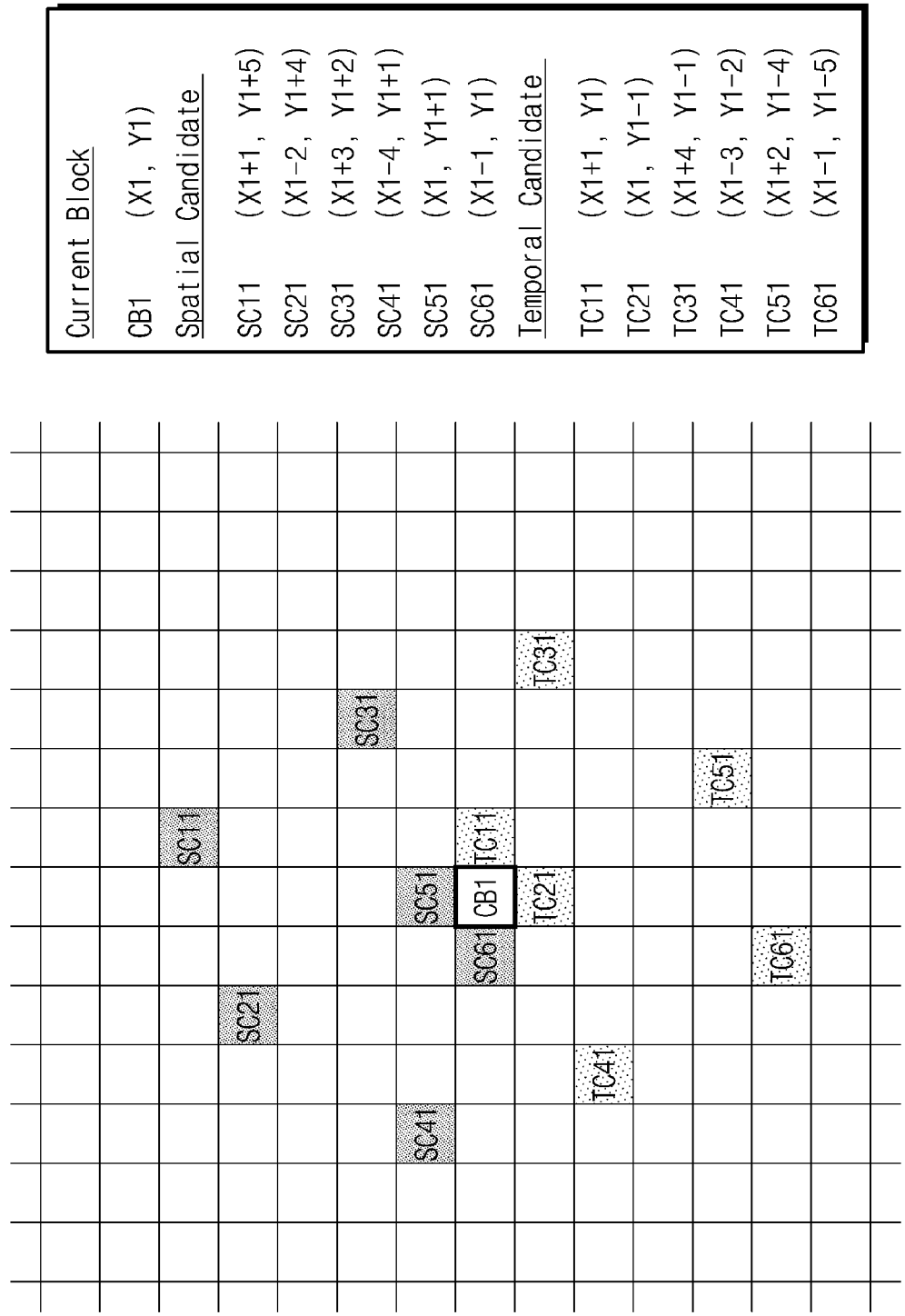
FIGS. 5A and 5B are conceptual diagrams illustrating examples of a current block and candidate blocks referenced in motion estimation.
Figure 5B:
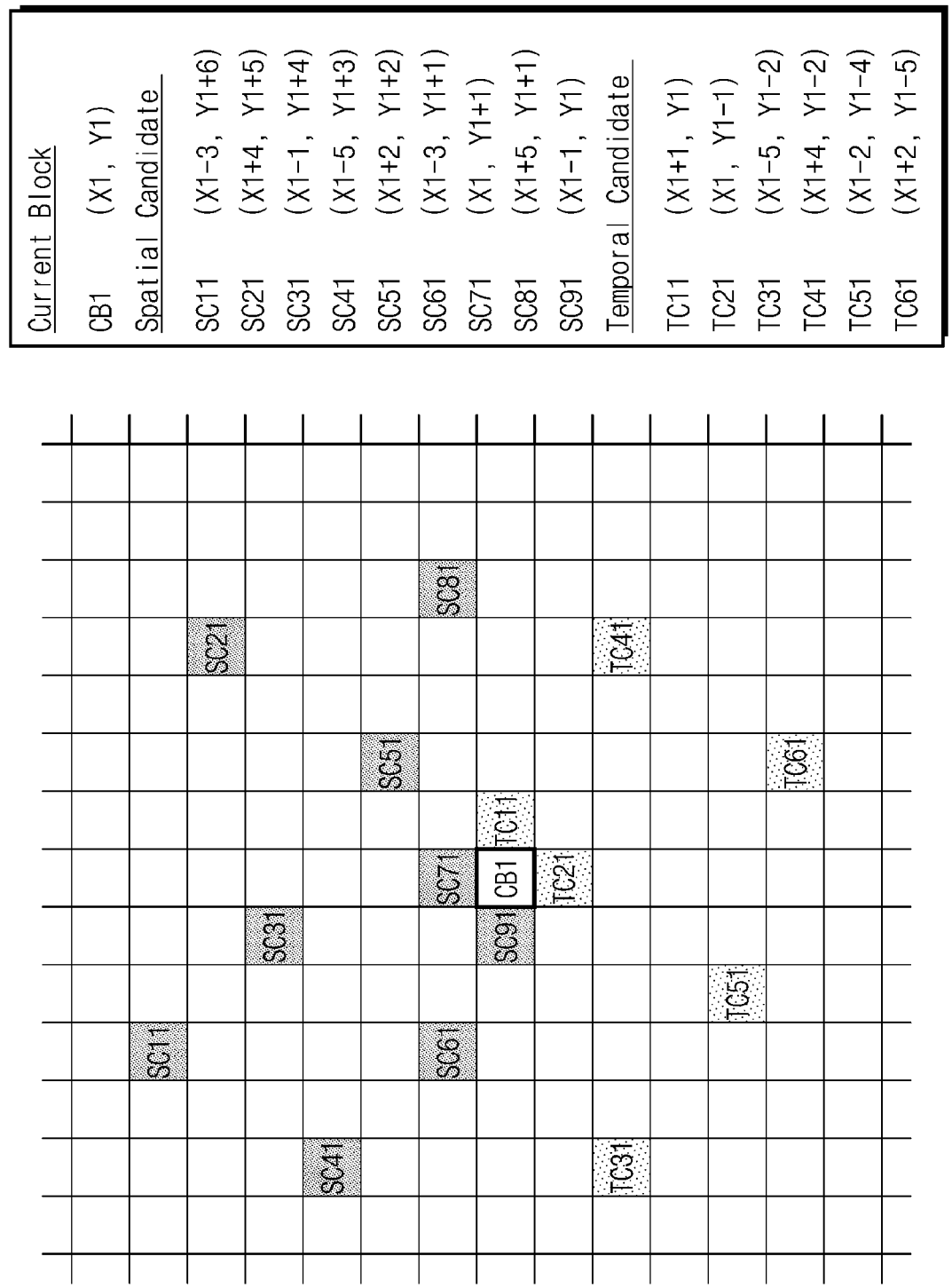
Figure 6:
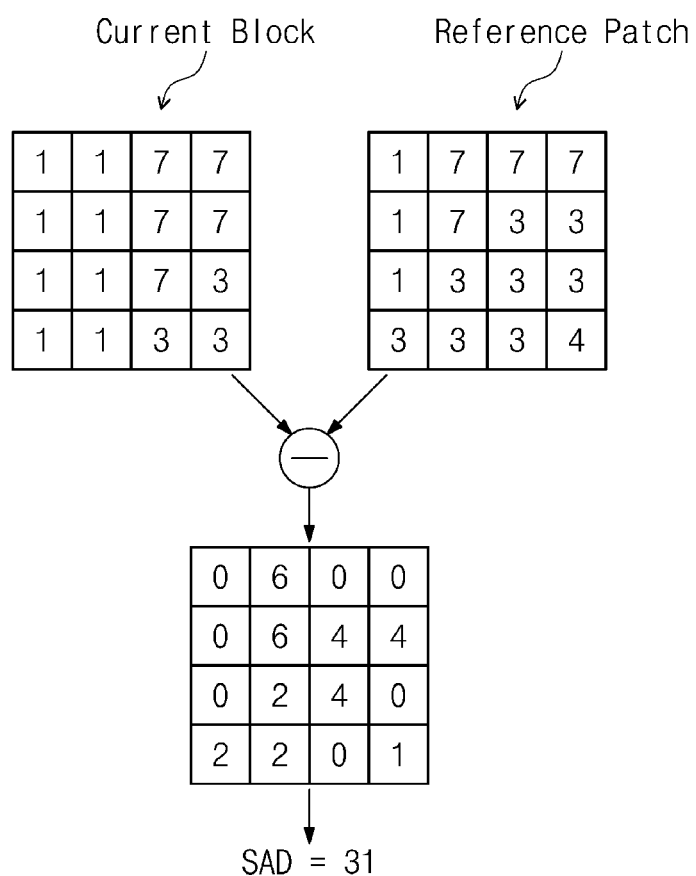
FIG. 6 is a conceptual diagram for describing a similarity between a current block and a reference patch.

FIG. 4 is a flowchart describing example operations for performing motion estimation. FIGS. 5A and 5B are conceptual diagrams illustrating examples of a current block and candidate blocks referenced in motion estimation. FIG. 6 is a conceptual diagram for describing a similarity between a current block and a reference patch. FIG. 7 and FIGS. 8A to 8C are conceptual diagrams for describing a full search for motion estimation. FIG. 9 is a conceptual diagram for describing following motion estimation for a next current block.

The motion estimation described in the present disclosure may be performed by the ISP 1130, the FRC 1730, the CODEC 1830, and/or another component. For example, a component employing the motion estimation may include an electronic circuit (refer to FIG. 10) for performing the motion estimation and the electronic circuit may perform operations described in the present disclosure. Additionally or alternatively, as an instruction is executed by one or more processors, the instruction may cause the one or more processors (e.g., the main processor 1800) to perform operations described in the present disclosure.

Referring to FIG. 4, the motion estimation may determine a current block (S110 of FIG. 4). The current block may mean a block, where an operation of generating a motion vector is to be performed in a current recursion, among blocks constituting an image provided as a current frame. A current location may correspond to a current location (e.g., coordinate) on the image. As described with reference to FIGS. 3A to 3C, a current block and a current location may be determined according to an order following blocks.

The motion estimation may determine candidate blocks (S120 of FIG. 4). The candidate blocks may mean blocks having candidate motion vectors to be referenced to obtain a motion vector for the current block. A candidate motion vector, which indicates a reference patch the most similar to the current block, among the candidate motion vectors may be expected as being suitable to obtain the motion vector for the current block. A patch or a reference patch may mean a unit area having the same size as a size of a block at a location on the image of the current frame.

The candidate blocks may correspond to relative locations with respect to the current location of the current block on the image. When the current location of the current block is determined on the image, the candidate blocks may be determined on respective relative locations on the basis of the location of the current block.

For example, referring to FIG. 5A, a current block CB1 may correspond to a current location of (X1, Y1). Candidate blocks SC11 to SC61 and TC11 to TC61 may respectively correspond to relative locations with respect to the current location. For example, the candidate block SC11 may correspond to (X1+1, Y1+5) which is a relative location with respect to the location of (X1, Y1). Descriptions associated with locations of other candidate blocks will be omitted below for brevity.

However, the present disclosure is not limited to FIG. 5A, and relative locations of candidate blocks may be variously changed or modified. For example, referring to FIG. 5B, the current block CB1 may correspond to the current location of (X1, Y1), and candidate blocks SC11 to SC91 and TC11 to TC61 may respectively correspond to relative locations with respect to the current location.

From the following descriptions, it may be readily understood that example candidate blocks of FIGS. 5A and 5B are provided to facilitate better understanding. However, to facilitate better understanding in the following descriptions, it will be assumed that the motion estimation is based on a coordinate relationship between the current location of the current block CB1 and the relative locations of the candidate blocks SC11 to SC61 and TC11 to TC61 illustrated in FIG. 5A.

Attributes such as the number of candidate blocks, locations of candidate blocks, and distribution of candidate blocks may be designed taking into account various factors such as accuracy and performance of the motion estimation. For example, when the number of candidate blocks increases, accuracy of the motion estimation may be improved; whereas, an amount of data used for the motion estimation may increase and a time taken for the motion estimation may increase.

For example, distances between a current block and candidate blocks may be designed to take into account various ranges on an image. For example, it is likely that the candidate blocks SC51, SC61, TC11, and TC21 of relative locations corresponding to coordinates adjacent to the current location of the current block CB1 are suitable to obtain the motion vector for the current block CB1. Accordingly, the motion estimation may be designed such that the candidate blocks SC51, SC61, TC11, and TC21 are determined.

Meanwhile, in some cases, when an object corresponding to the current block CB1 moves rapidly and largely, it is likely that the candidate blocks SC11 to SC41 and TC31 to TC61 of relative locations corresponding to coordinates not adjacent to the current location of the current block CB1 are suitable to obtain the motion vector for the current block CB1. Accordingly, the motion estimation may be designed such that the candidate blocks SC11 to SC41 and TC31 to TC61 are determined.

For example, candidate blocks may be distributed to take into account a wide coverage on an image. For example, when the candidate block SC21 is not determined, it may be difficult to accurately estimate a motion toward the current block CB1 from the left top of the image. The candidate block SC21 may be determined to estimate a motion toward the current block CB1 from the left top of the image. As such, candidate blocks may be determined to take into account a motion of a wide coverage.

Relative locations of candidate blocks may be variously changed or modified to perform the motion estimation accurately and suitably. For example, relative locations of candidate blocks may be set in advance by a designer of a component (e.g., the ISP 1130, the FRC 1730, the CODEC 1830, and/or the like) employing the motion estimation before the electronic device 1000 operates. Alternatively, relative locations of candidate blocks may be reprogrammed suitably during an operation of the electronic device 1000.

Meanwhile, when the motion estimation is based on the order illustrated in FIG. 3A, motion vectors for the candidate blocks SC11 to SC61 may have been already generated with regard to the current frame. On the other hand, motion vectors for the candidate blocks TC11 to TC61 may not be yet generated with regard to the current frame. However, with regard to a previous frame, motion vectors for the candidate blocks TC11 to TC61 may have been generated.

The motion estimation may read data of reference patches from the buffer memory 1400 and/or the nonvolatile memory 1500 to refer to the reference patches indicated by candidate motion vectors of the candidate blocks corresponding to the relative locations. The motion estimation may refer to reference patches indicated by candidate motion vectors of the candidate blocks SC11 to SC61 based on the data of the image of the current frame. In this regard, the candidate blocks SC11 to SC61 may be understood as spatial candidate blocks.

The motion estimation may refer to reference patches indicated by candidate motion vectors of the candidate blocks TC11 to TC61 based on data of an image of a previous frame. In this regard, the candidate blocks TC11 to TC61 may be understood as temporal candidate blocks.

Returning to FIG. 4, the motion estimation may calculate a similarity between the current block and each of the reference patches indicated by the candidate motion vectors of the candidate blocks (S130 of FIG. 4). It is likely that a candidate motion vector indicating a reference patch the most similar to the current block is similar to a motion vector intended to be obtained with regard to the current block. The motion estimation may determine which reference patch is the most similar to the current block, based on the similarity calculation.

For example, the motion estimation may determine one reference patch based on the greatest similarity (S140 of FIG. 4). That is, a similarity calculated with regard to the determined one reference patch may be the greatest similarity among similarities calculated with regard to all reference patches. In the present disclosure, a candidate motion vector indicating the determined one reference patch may be referred to as a best candidate motion vector.

The similarity between the current block and the reference patch may be calculated in various manners. For example, referring to FIG. 6, a similarity may be calculated based on a pixel value. The pixel value may mean a value (e.g., an RGB value, a brightness value, a transparency value, and/or the like) corresponding to a pixel constituting a block or a patch.

For example, the motion estimation may calculate differences between pixel values of the current block and pixel values of the reference patch. Then, the motion estimation may calculate a sum of the calculated differences. The calculated sum may be understood as a sum of absolute difference (SAD).

The similarity may be calculated based on the SAD. When the SAD calculated with regard to the reference patch is great, it may be understood that the similarity between the reference patch and the current block is small. On the other hand, when the SAD calculated with regard to the reference patch is small, it may be understood that the similarity between the reference patch and the current block is great. It may be understood that, among the reference patches, a reference patch which corresponds to the smallest SAD is the most similar to the current block.

In such a manner, the motion estimation may determine one reference patch, which is the most similar to the current block, among reference patches. However, the similarity calculation described with reference to FIG. 6 is one of possible manners and is not intended to limit the present disclosure. The similarity calculation may be variously changed or modified to be suitable for the motion estimation.

Returning to FIG. 4, the motion estimation may perform a full search based on the determined one reference patch (S150 of FIG. 4). For example, the determined one reference patch may be more similar to the current block than other reference patches but may be somewhat different from the current block. Accordingly, the full search may provide fine tuning for searching for a patch which is more similar to the current block within a search range around the determined one reference patch.

The motion estimation may determine a final reference patch within the search range through the full search (S160 of FIG. 4). The final reference patch may mean a reference patch, which is determined as being the most similar to the current block, among patches included in the search range. In the present disclosure, a motion vector indicating the final reference patch may be referred to as a final motion vector.

Figure 7:
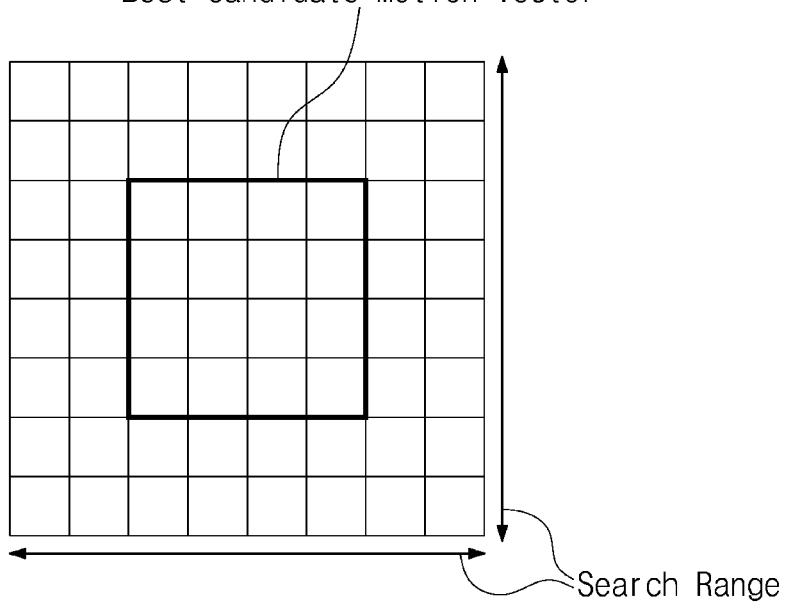

Referring to FIG. 7, when a reference patch indicated by the best candidate motion vector is determined based on similarity calculation, the motion estimation may set the search range around the determined reference patch. The search range may mean a range where the full search is performed.

The search range may include pixels constituting the determined reference patch. In addition, the search range may further include pixels which are determined based on locations of pixels of the determined reference patch. For example, the search range may be set to further include several pixels along a horizontal direction and a vertical direction on the basis of the pixels of the determined reference patch. However, this is only one of possible examples, and is not intended to limit the present disclosure.

Afterwards, the motion estimation may combine pixels included in the search range to determine search patches. The motion estimation may determine the final reference patch based on a similarity between pixels constituting each search patch and pixels constituting the current block. The similarity may be calculated through the manner described with reference to FIG. 6 or another manner.

Figure 8A:
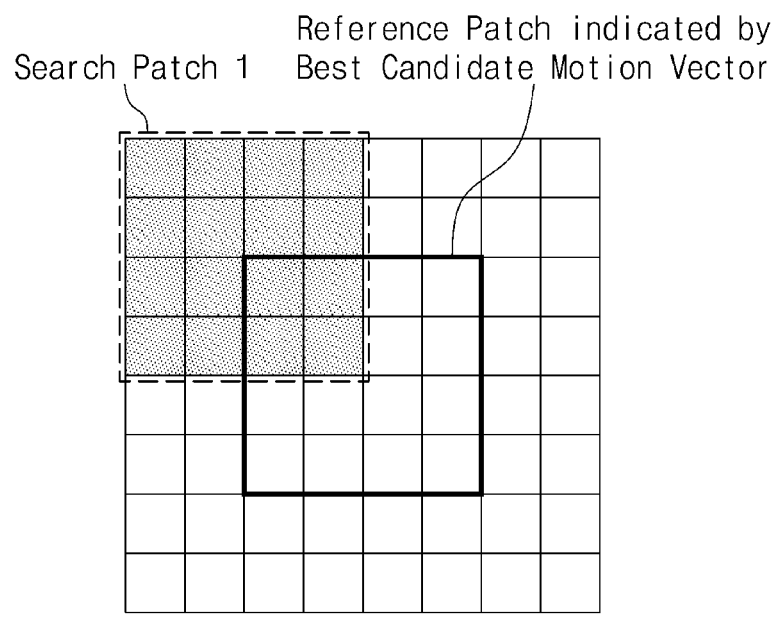
Figure 8B:
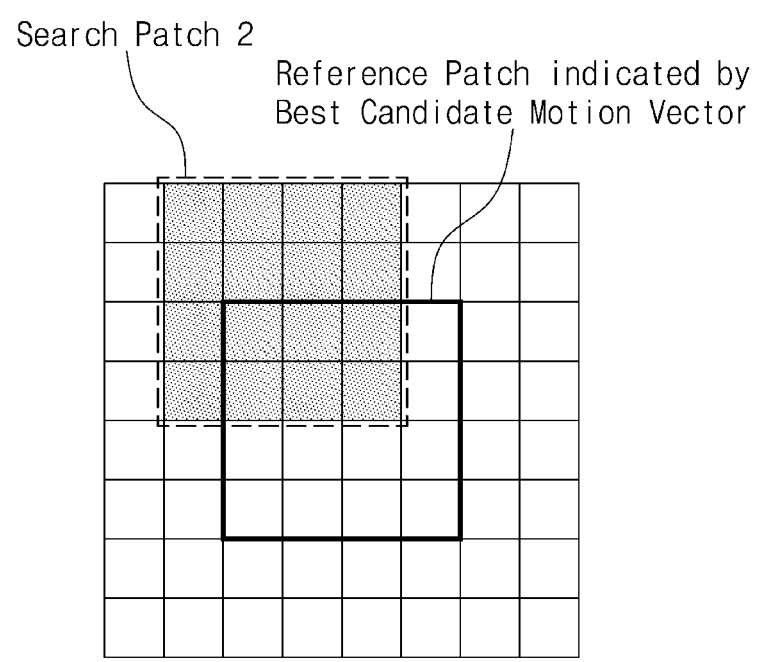
Figure 9:
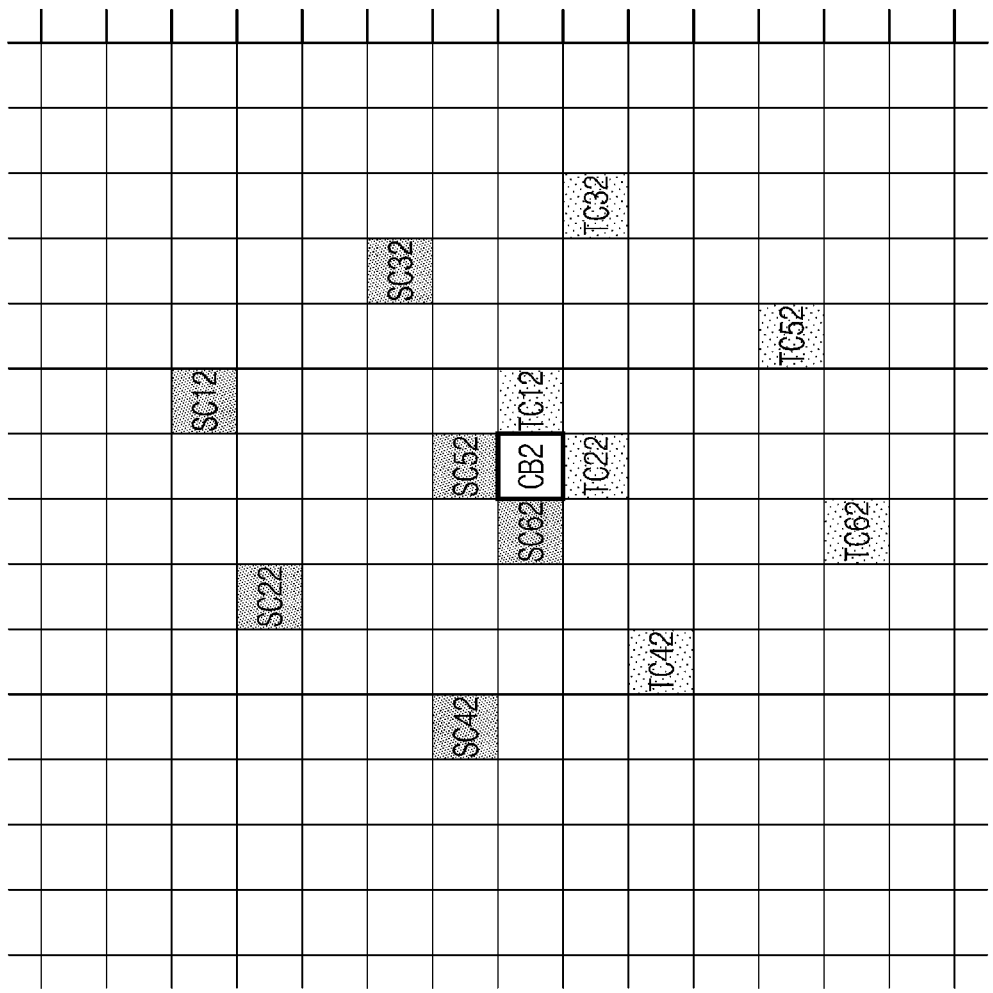
FIG. 9 is a conceptual diagram for describing following motion estimation for a next current block.

For example, referring to FIG. 8A, the motion estimation may determine a first search patch including pixels, the number of which is identical to the number of pixels constituting the current block, within the search range and may calculate a similarity between the current block and the first search patch. In addition, referring to FIG. 8B, in a similar manner, the motion estimation may determine a second search patch within the search range and may calculate a similarity between the current block and the second search patch.

In such a manner, referring to FIG. 8C, the motion estimation may determine a plurality of search patches within the search range by combining pixels, the number of which is identical to the number of the pixels constituting the current block. For example, in a similar manner, the motion estimation may determine a sixth search patch and a twenty-fifth search patch. In addition, the motion estimation may calculate a similarity between the current block and each of the plurality of search patches.

The motion estimation may determine a search patch, which is the most similar to the current block, among the plurality of search patches as the final reference patch. Through the full search of FIGS. 7 to 8C, the motion estimation may determine the final reference patch which is the most similar to the current block. For example, it is likely that the final motion vector indicating the final reference patch is similar to a motion vector that the motion estimation intends to obtain from the current block. Accordingly, the final motion vector may be the most suitable to obtain the motion vector for the current block.

Through operation S110 to operation S160, the motion estimation may obtain the motion vector for the current block based on the final candidate motion vector among the candidate motion vectors which the candidate blocks have. For example, the motion vector for the current block may be generated based on the final motion vector indicating the final reference patch within the search range. The generated motion vector may describe a location change of the current block or a motion of an object associated with the current block.

Meanwhile, when motion vectors are not generated with regard to all the blocks constituting the image of the current frame (No of operation S170 of FIG. 4), operation S110 to operation S160 may be performed on a block where the motion vector is not generated. To this end, the motion estimation may newly determine a current block such that a current location on the image of the current frame moves to correspond to a block where the motion vector is not generated.

For example, when a motion vector for the current block CB1 of FIG. 5A is generated, the motion estimation may newly determine a current block CB2 of FIG. 9. Referring to FIG. 9, for example, the current block CB2 may be determined such that a current location of (X2, Y2) corresponding to the current block CB2 moves from the location (X1, Y1) of FIG. 5A (e.g., when the order of FIG. 3A is employed, (X2, Y2)=(X1+1, Y1)). Operation S110 to operation S160 may be performed to generate a motion vector for the current block CB2.

To generate the motion vector for the current block CB2, the motion estimation may determine candidate blocks SC12 to SC62 and TC12 to TC62. The candidate blocks SC12 to SC62 and TC12 to TC62 may correspond to relative locations with respect to the current location (X2, Y2) of the current block CB2.

The motion estimation may determine candidate blocks such that a coordinate relationship between the moved current location and the relative locations corresponding to the candidate blocks does not change. For example, comparing FIG. 5A with FIG. 9, a coordinate relationship between the current location of the current block CB2 and relative locations of the candidate blocks SC12 to SC62 and TC12 to TC62 in FIG. 9 may be identical to the coordinate relationship between the current location of the current block CB1 and the relative locations of the candidate blocks SC11 to SC61 and TC11 to TC61 in FIG. 5A. That is, the motion estimation may determine candidate blocks without changing relative locations which are set in advance or reprogrammed.

The operations described with reference to FIGS. 4 to 9 may be recursively performed on blocks constituting an image of a current frame. That is, for each recursion for the blocks constituting the image, the motion estimation may determine a current block and candidate blocks, may determine a final reference patch based on similarities with regard to reference patches indicated by motion vectors that the candidate blocks have, and may generate a motion vector for the current block from a final motion vector indicating the final reference patch. For each recursion for the blocks constituting the image, relative locations with respect to the current location may not change.

After motion vectors for all blocks constituting the image of the current frame are generated (Yes of S170 of FIG. 4), recursions for the blocks constituting the image may be completed. The image where the motion estimation is completed may be referenced by the ISP 1130, the FRC 1730, the CODEC 1830, and/or another component. Afterwards, for example, with regard to a next frame following the current frame, the operations described with reference to FIGS. 4 to 9 may be performed.

The motion estimation described with reference to FIGS. 4 to 9 may be performed with reference to a candidate block where a motion vector has been already generated. Such motion estimation may use data of an image of a previous frame in addition to data of an image of a current frame. In this regard, such motion estimation may be understood as employing a 3-dimensional recursive search (3DRS) manner.

Figure 10:
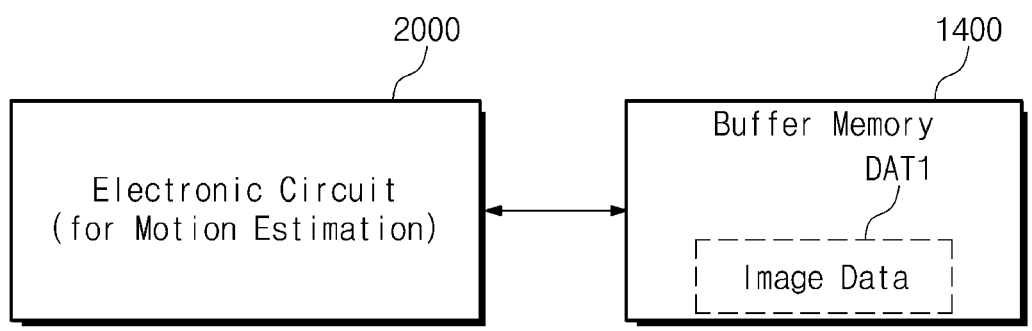
FIG. 10 is a block diagram illustrating an example configuration for performing motion estimation according to some example embodiments.

FIG. 10 is a block diagram illustrating an example configuration for performing motion estimation according to some example embodiments.

In some example embodiments, an electronic circuit 2000 for performing the motion estimation between images may be provided. The motion estimation described in the present disclosure may be performed by the electronic circuit 2000.

For example, the electronic circuit 2000 may be included in the ISP 1130, the FRC 1730, the CODEC 1830, and/or another component. Alternatively, the electronic circuit 2000 may be implemented in an independent IP. The electronic circuit 2000 may be shared by the ISP 1130, the FRC 1730, the CODEC 1830, and/or another component, or may be separately provided for the ISP 1130, the FRC 1730, the CODEC 1830, and/or another component.

The electronic circuit 2000 may include hardware circuits (e.g., hardware circuits, logic circuits, and/or the like) configured to perform the motion estimation described in the present disclosure. In some example embodiments, the electronic circuit 2000 may be implemented in an application specific integrated circuit (ASIC) or a field programmable gate array (FPGA).

Additionally or alternatively, the electronic circuit 2000 may be a portion of one or more processors (e.g., the main processor 1800), and may execute instructions of a program code configured to provide the motion estimation described in the present disclosure. In some cases, the buffer memory 1400 and/or the nonvolatile memory 1500 may store instructions and the electronic circuit 2000 may communicate with the buffer memory 1400 and/or the nonvolatile memory 1500 to execute the instructions.

For example, the buffer memory 1400 may store image data DAT1. The image data DAT1 may include, at least, data of an image of a current frame and data of an image of a previous frame. For example, the image data DAT1 may include information of pixel values. While performing the motion estimation, the electronic circuit 2000 may communicate with the buffer memory 1400 to read the image data DAT1.

Although not illustrated in FIG. 10, in some cases, the nonvolatile memory 1500 may store the image data DAT1. In this case, the electronic circuit 2000 may communicate with the nonvolatile memory 1500 to read the image data DAT1. Alternatively, the image data DAT1 of the nonvolatile memory 1500 may be loaded to the buffer memory 1400 and the electronic circuit 2000 may communicate with the buffer memory 1400.

For example, the electronic circuit 2000 may read data associated with reference patches indicated by candidate motion vectors which candidate blocks have, from the image data DAT1 of the buffer memory 1400 (and/or the nonvolatile memory 1500), to refer to the reference patches in the motion estimation. When the number of candidate blocks increases, an amount of data referenced for the motion estimation may increase. In this case, a long time may be taken to read data from a memory and to process the read data. Accordingly, as a speed of processing data decreases, a time taken for the motion estimation may increase, and a large amount of power may be consumed to process data. In addition, as a bandwidth or a frequency for memory access increases, power consumption of a memory may increase.

Accordingly, in terms of performance and power consumption, reducing an amount of data referenced for the motion estimation may be advantageous to make user satisfaction high. Examples of reducing an amount of data in the motion estimation will be described with reference to FIGS. 11 to 16.

Figure 11:
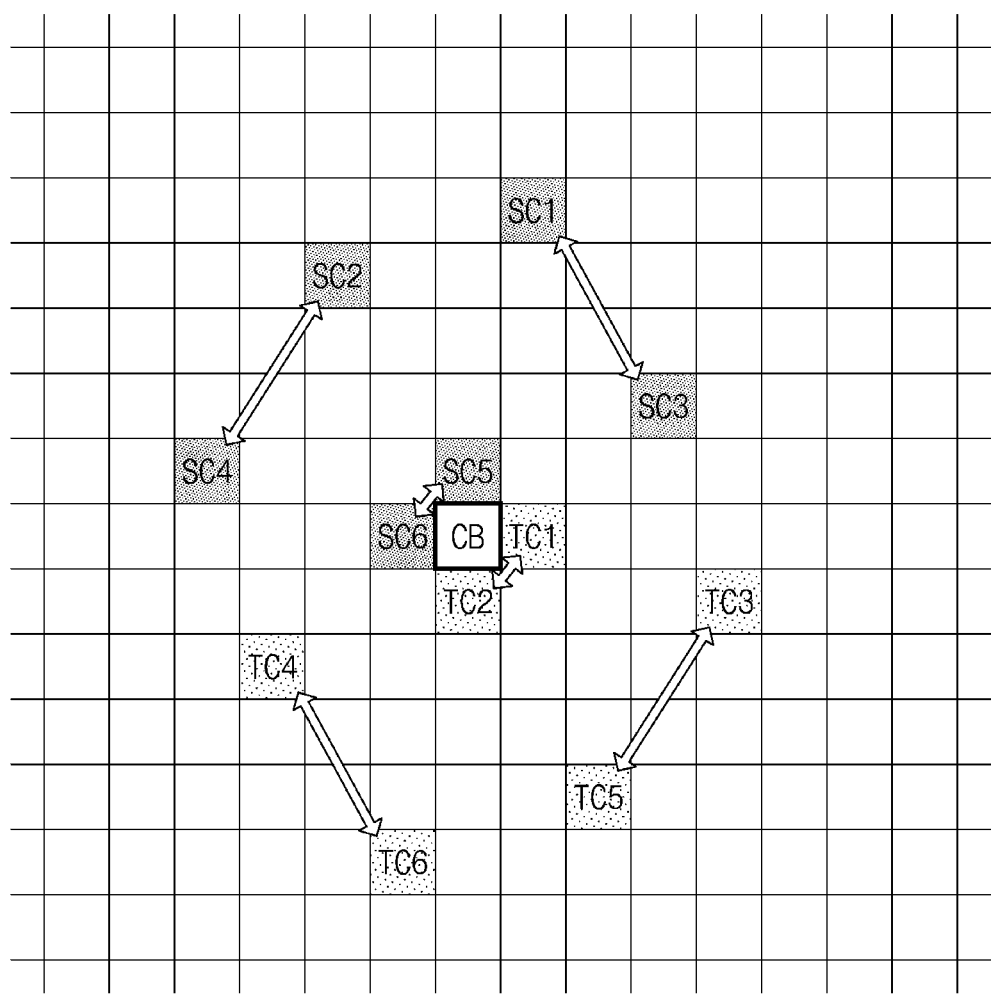
FIGS. 11, 12A, 12B, 13, 14, 15A to 15D, and 16 are conceptual diagrams illustrating examples of selecting some of candidate blocks in motion estimation according to some example embodiments.
Figure 12A:
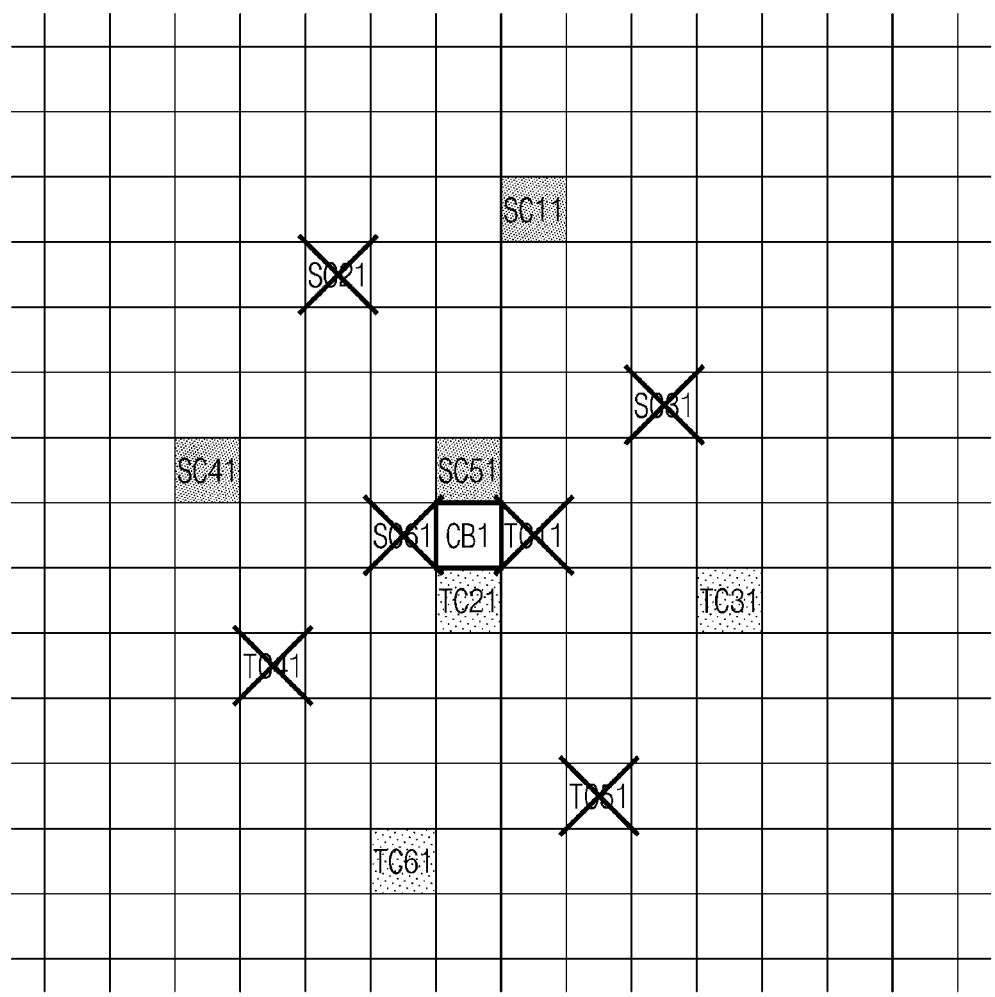
Figure 12A:
Figure 12B:
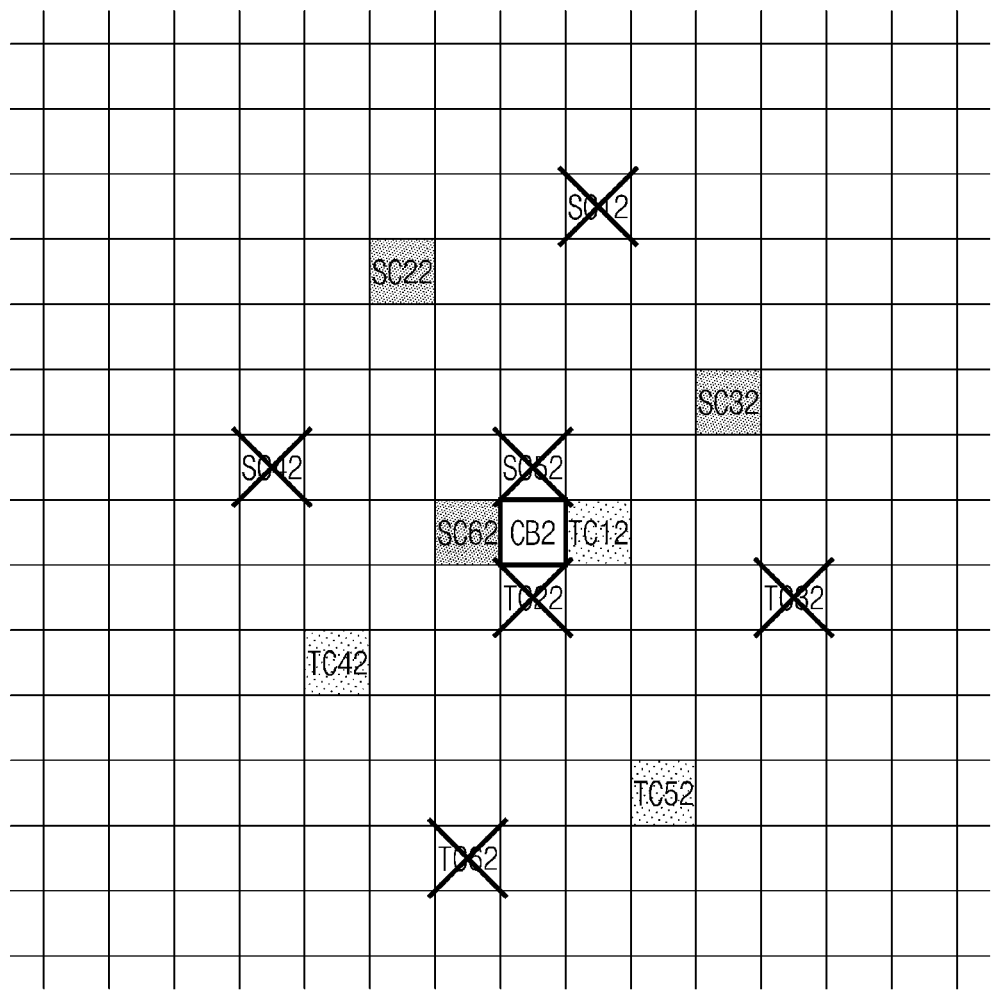

FIGS. 11, 12A and 12B are conceptual diagrams illustrating an example of selecting some of candidate blocks in motion estimation according to some example embodiments.

Referring to FIG. 11, the motion estimation may determine candidate blocks SC1 to SC6 and TC1 to TC6 on relative locations with respect to a current location of a current block CB. In example embodiments, the motion estimation may select some of the candidate blocks SC1 to SC6 and TC1 to TC6. To generate a motion vector for the current block CB, the motion estimation may use only selected candidate blocks instead of using all the candidate blocks SC1 to SC6 and TC1 to TC6. One reference patch may be determined based on reference patches indicated by candidate motion vectors which the selected candidate blocks have, and the motion vector may be obtained based on a final motion vector indicating a final reference patch which is obtained from the determined one reference patch.

In some example embodiments, the motion estimation may alternately select candidate blocks, which are to be used to generate the motion vector, from all the candidate blocks SC1 to SC6 and TC1 to TC6. For example, for each recursion for blocks constituting an image, the candidate blocks SC1 and SC3 may be alternately selected, the candidate blocks SC2 and SC4 may be alternately selected, and the candidate blocks SC5 and SC6 may be alternately selected. In addition, the candidate blocks TC1 and TC2 may be alternately selected, the candidate blocks TC3 and TC5 may be alternately selected, and the candidate blocks TC4 and TC6 may be alternately selected (herein, alternately selecting candidate blocks may be understood as alternately selecting relative locations corresponding to the candidate blocks).

For example, FIG. 12A is associated with a recursion for the current block CB1, and FIG. 12B is associated with a recursion for the current block CB2 following the recursion of FIG. 12A. Referring to FIG. 12A, candidate blocks SC11, SC41, SC51, TC21, TC31, and TC61 may be selected to be used to generate a motion vector for the current block CB1. On the other hand, unselected candidate blocks SC21, SC31, SC61, TC11, TC41, and TC51 may not be used to generate the motion vector for the current block CB1.

Referring to FIG. 12B, after the motion vector for the current block CB1 is generated, candidate blocks SC22, SC32, SC62, TC12, TC42, and TC52 may be selected to be used to generate a motion vector for the current block CB2. On the other hand, unselected candidate blocks SC12, SC42, SC52, TC22, TC32, and TC62 may not be used to generate the motion vector for the current block CB2.

Comparing FIG. 12A with FIG. 12B based on FIG. 11, with regard to relative locations corresponding to the candidate blocks SC11, SC41, SC51, TC21, TC31, and TC61 selected in the recursion of FIG. 12A, a candidate block may not be selected in the recursion of FIG. 12B. In addition, with regard to relative locations corresponding to the candidate blocks SC22, SC32, SC62, TC12, TC42, and TC52 selected in the recursion of FIG. 12B, a candidate block may not be selected in the recursion of FIG. 12A.

Returning to FIG. 11, for each recursion for the blocks constituting the image, the relative locations corresponding to the candidate blocks SC1 to SC6 and TC1 to TC6 may be continuously alternately selected and only candidate motion vectors of candidate blocks corresponding to the selected relative locations may be referenced to generate a motion vector. Alternately selecting the relative locations corresponding to the candidate blocks SC1 to SC6 and TC1 to TC6 may be continued for all the blocks constituting the image.

In such a manner, for each recursion for the blocks constituting the image, at least one of relative locations corresponding to candidate blocks to be referenced to generate a motion vector may change.

Accordingly, at least one of relative locations corresponding to candidate blocks selected in a preceding recursion (e.g., the recursion of FIG. 12A) may be different from each of relative locations corresponding to candidate blocks selected in a following recursion (e.g., the recursion of FIG. 12B). For example, a relative location corresponding to the candidate block SC11 selected in the recursion of FIG. 12A may be different from each of the relative locations corresponding to the candidate blocks SC22, SC32, SC62, TC12, TC42, and TC52 selected in the recursion of FIG. 12B.

Meanwhile, with regard to a relative location corresponding to a candidate block which is not selected in a preceding recursion, a candidate block may be selected in a following recursion. For example, with regard to a relative location corresponding to the candidate block SC21 which is not selected in the recursion of FIG. 12A, the candidate block SC22 may be selected in the recursion of FIG. 12B.

As such, the motion estimation may refer to candidate blocks such that relative locations corresponding to candidate blocks used in each recursion for the blocks constituting the image (e.g., the recursion of FIG. 12A and the recursion of FIG. 12B) are alternately selected from all relative locations corresponding to all candidate blocks referenced during all recursions for the blocks constituting the image.

Accordingly, the number of relative locations corresponding to candidate blocks used in each recursion for blocks constituting an image may be less than the number of all relative locations corresponding to all candidate blocks. For example, in the example of FIG. 11, there may be twelve (12) relative locations in correspondence with all the candidate blocks SC1 to SC6 and TC1 to TC6. However, there may be six (6) relative locations in correspondence with candidate blocks referenced in the recursion of FIG. 12A (or in the recursion of FIG. 12B).

When only selected candidate blocks are used rather than all candidate blocks being used, the number of candidate blocks may decrease. In example embodiments, the motion estimation may be performed based on candidate motion vectors of the decreased number of candidate blocks and an amount of data referenced for the motion estimation may decrease. For example, an amount of data read from a memory may be less than an amount of data for referring to all candidate motion vectors of all candidate blocks as described with reference to FIG. 5A.

In this case, a time taken to read data from a memory and to process the read data may decrease. Accordingly, as a speed of processing data is improved, a time taken for the motion estimation may decrease and an amount of power consumed to process data may decrease. As a bandwidth or a frequency for memory access decreases, power consumption of a memory may decrease.

Meanwhile, in some example embodiments, selected relative locations and unselected relative locations may be designed taking into account accuracy of the motion estimation. For example, the selected relative locations and the unselected relative locations may be suitably distributed to take into account various ranges and a wide coverage on an image for each recursion for blocks constituting the image.

For example, when the candidate block TC41 is selected instead of the candidate block TC31 in the recursion of FIG. 12A, it may be difficult to accurately estimate a fast motion toward the current block CB1 from the right side of the image. Accordingly, in the recursion of FIG. 12A, selecting the candidate block TC31 may be more advantageous than selecting the candidate block TC41. However, in the next recursion of FIG. 12B, the candidate block TC42 corresponding to a relative location of the candidate block TC41 may be selected instead of the candidate block TC32 corresponding to a relative location of the candidate block TC31.

The selection of relative locations described with reference to FIGS. 11, 12A, and 12B is only one of possible examples, and the present disclosure is not limited thereto. Selected relative locations and unselected relative locations may be variously changed or modified to be suitable for the motion estimation, which will be further described with reference to FIGS. 13 to 16.

Selecting relative locations of candidate blocks to be used for the motion estimation has been described with reference to FIGS. 11, 12A, and 12B. However, the example embodiments may be variously changed or modified to determine relative locations of candidate blocks which are not to be used in the motion estimation.

In these example embodiments, the motion estimation may exclude a relative location of at least one of all relative locations such that at least one of candidate blocks corresponding to all the relative locations is not used for each recursion for blocks constituting an image. In this case, it may be understood that the excluded relative location is not selected and a candidate motion vector of a candidate block corresponding to the unselected relative location is not referenced in the motion estimation.

Selected relative locations and unselected relative locations may be set in advance by a designer before the electronic circuit 2000 operates. Alternatively, selected relative locations and unselected relative locations may be reprogrammed suitably during an operation of the electronic circuit 2000.

Figure 13:
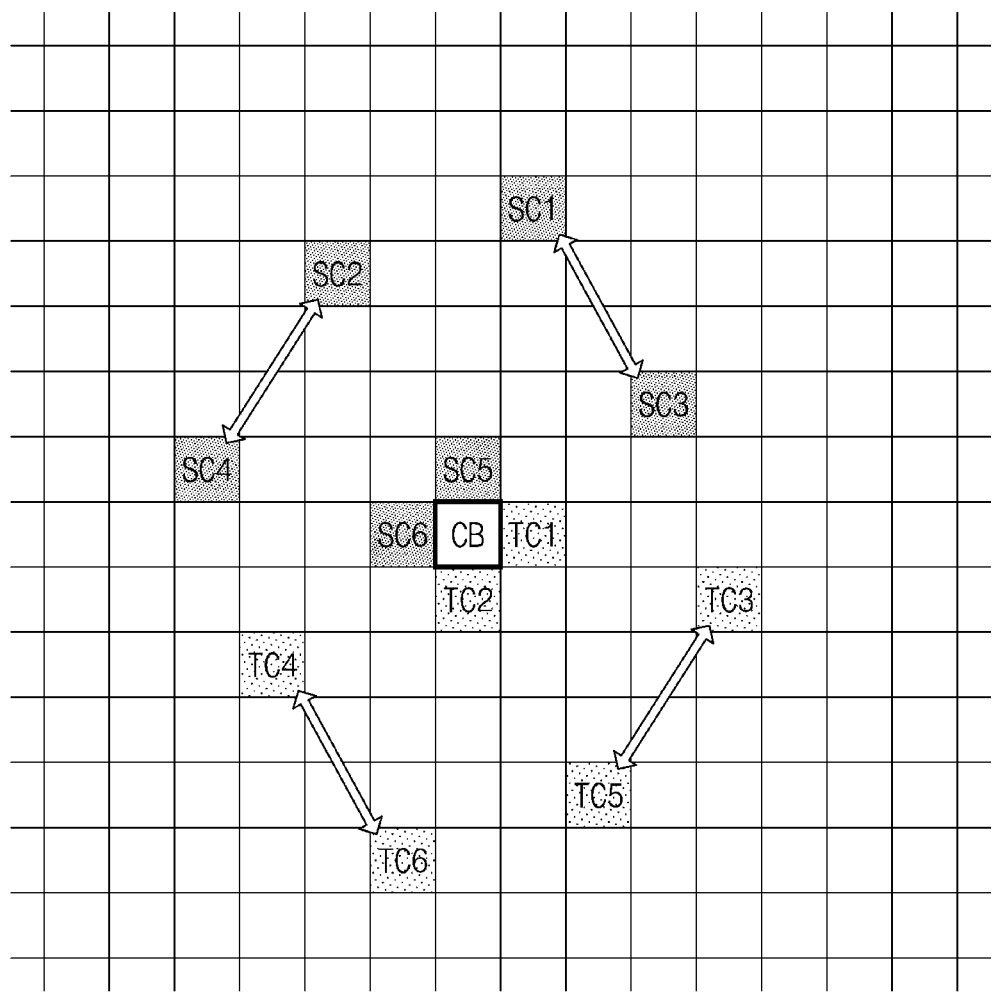

FIG. 13 is a conceptual diagram illustrating an example of selecting some of candidate blocks in motion estimation according to some example embodiments.

For example, it is likely that reference patches indicated by candidate motion vectors of the candidate blocks SC5, SC6, TC1, and TC2 of relative locations corresponding to coordinates adjacent to the current location of the current block CB is similar to the current block CB (and thus, it is likely that the reference patches are suitable to generate the motion vector for the current block CB). In some example embodiments, relative locations corresponding to the candidate blocks SC5, SC6, TC1, and TC2 may be selected in all recursions for blocks constituting an image without being unselected.

In other words, in some example embodiments, for each recursion for blocks constituting an image, relative locations corresponding to candidate blocks used to generate a motion vector may include relative locations, which correspond to coordinates adjacent to a current location of a current block on the image (e.g., relative locations corresponding to the candidate blocks SC5, SC6, TC1, and TC2), among all relative locations.

On the other hand, the candidate blocks SC1 to SC4 and TC3 to TC6 of relative locations corresponding to coordinates which are not adjacent to the current location of the current block CB (or which are distant from the current location of the current block CB) may be alternately selected (or may be alternately unselected). For example, for each recursion for blocks constituting an image, the candidate blocks SC1 and SC3 may be alternately selected, and the candidate blocks SC2 and SC4 may be alternately selected. In addition, the candidate blocks TC3 and TC5 may be alternately selected, and the candidate blocks TC4 and TC6 may be alternately selected.

In other words, in some example embodiments, for each recursion for blocks constituting an image, relative locations which are not adjacent to a current location of a current block (or which are distant from the current location of the current block) may be alternately selected (or may be alternately unselected). In this case, at least one selected or unselected (e.g., excluded) relative location may include a relative location, which corresponds to a coordinate not adjacent to the current location of the current block on the image, among all relative locations.

FIG. 14 and FIG. 15A to 15D are conceptual diagrams illustrating an example of selecting some of candidate blocks in motion estimation according to some example embodiments.

Figure 14:
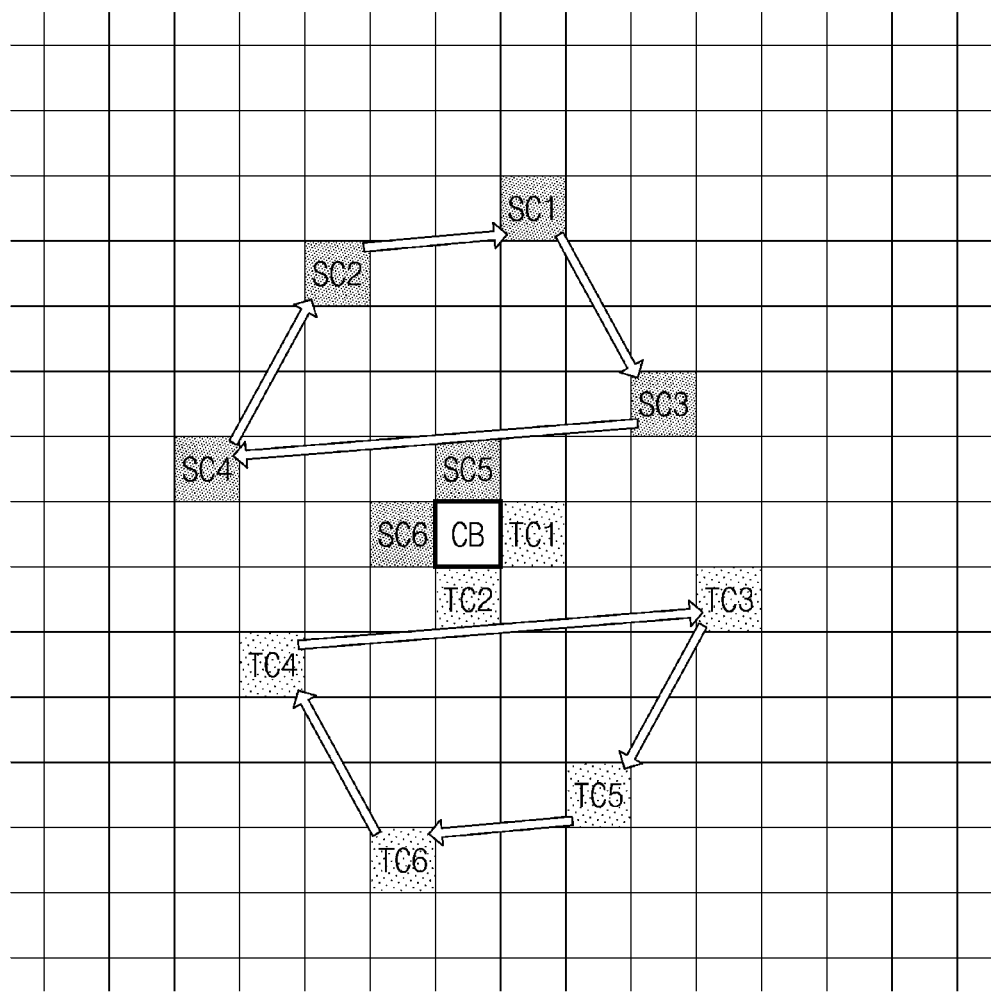

FIGS. 11 to 13 illustrate that two candidate blocks are alternately selected. Referring to FIG. 14, the present disclosure is not limited to FIGS. 11 to 13, and several candidate blocks may be alternately selected (or may be alternately unselected). For example, for each recursion for blocks constituting an image, the candidate blocks SC1 to SC4 may be alternately selected (or may be alternately unselected), and the candidate blocks TC3 to TC6 may be alternately selected (or may be alternately unselected).

Figure 15A:
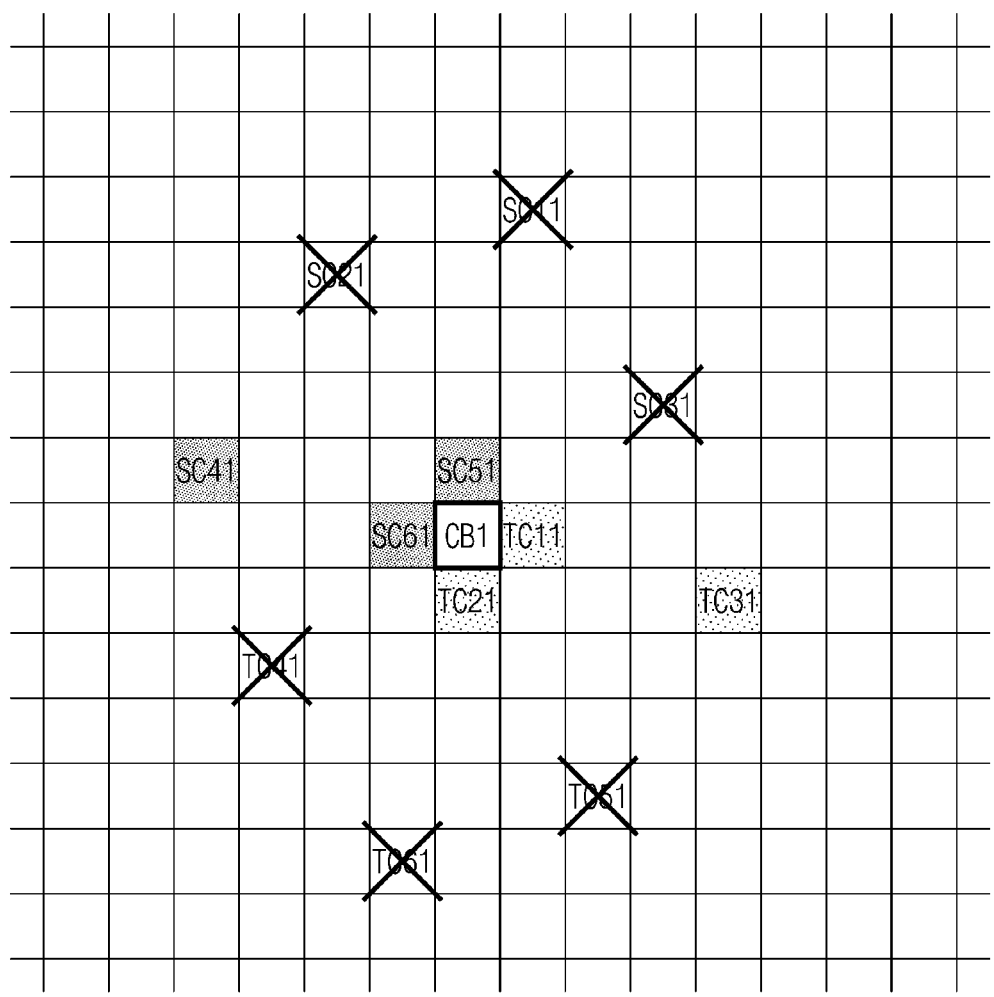
Figure 15B:
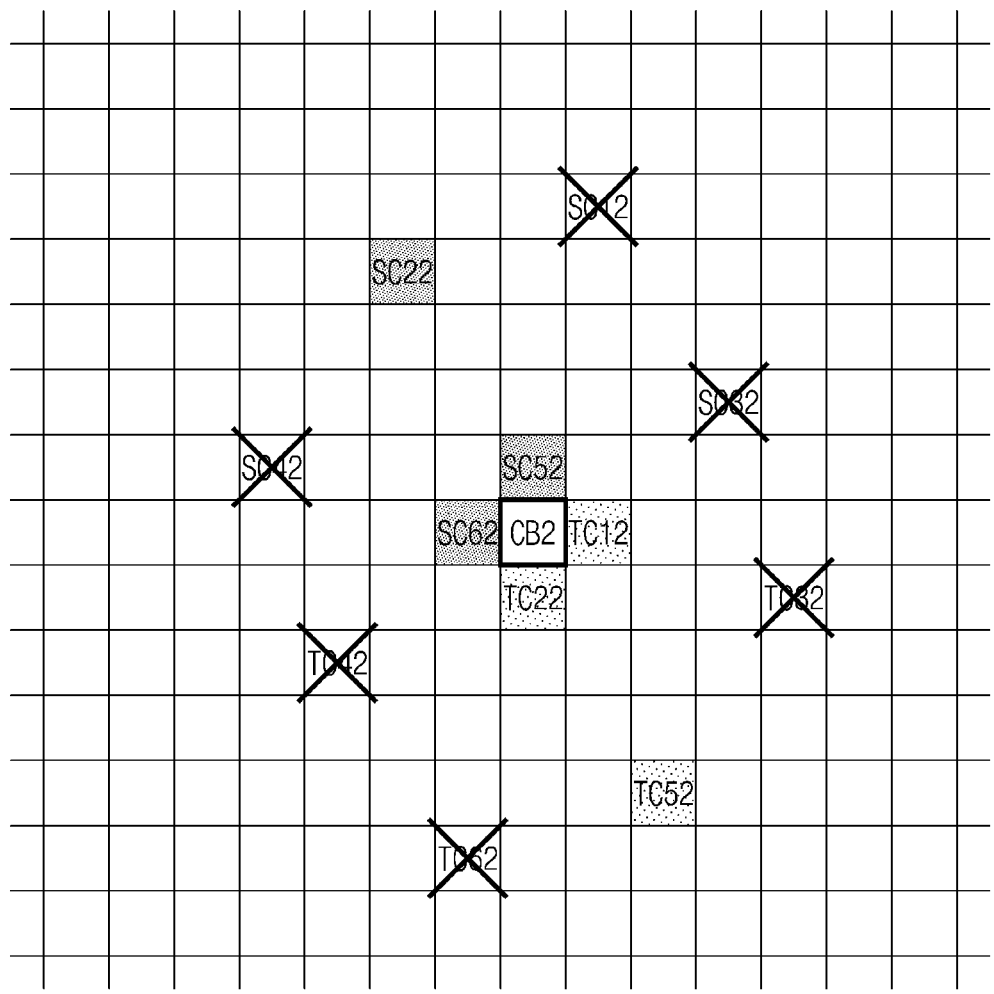
Figure 15C:
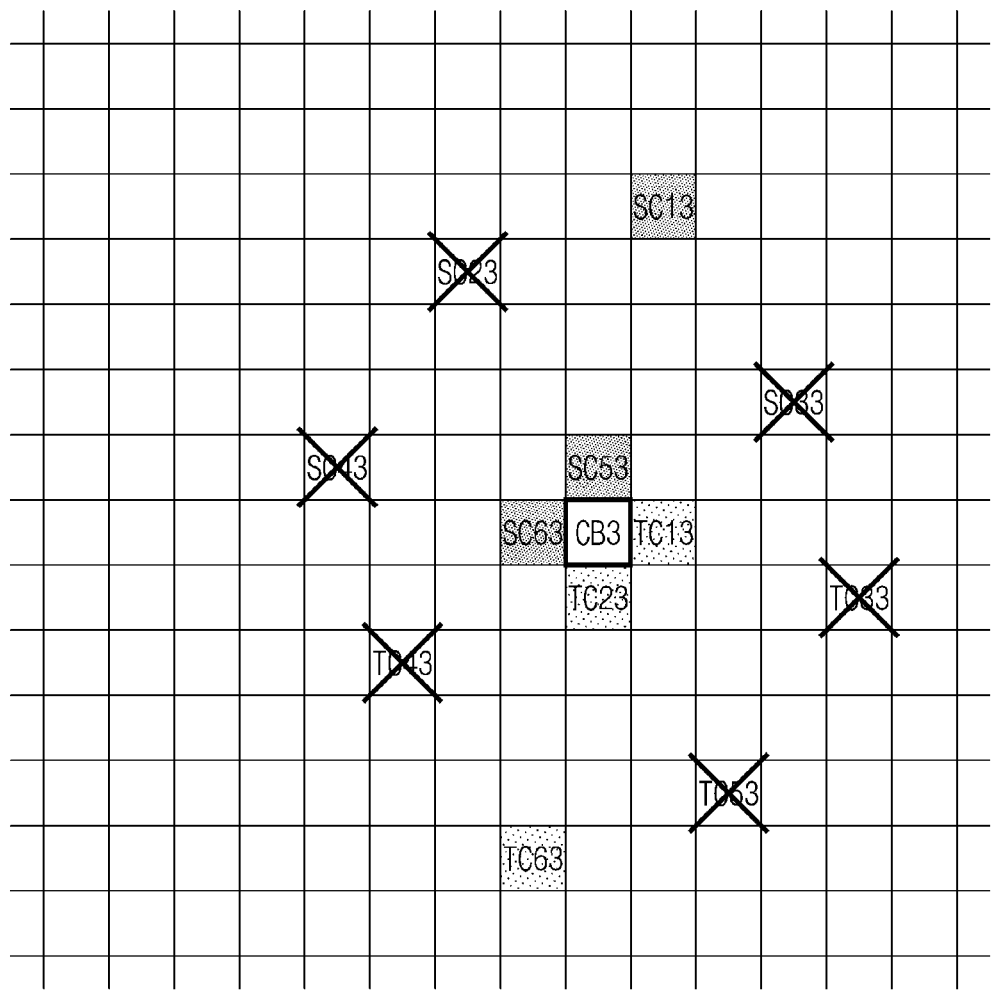
Figure 15D:
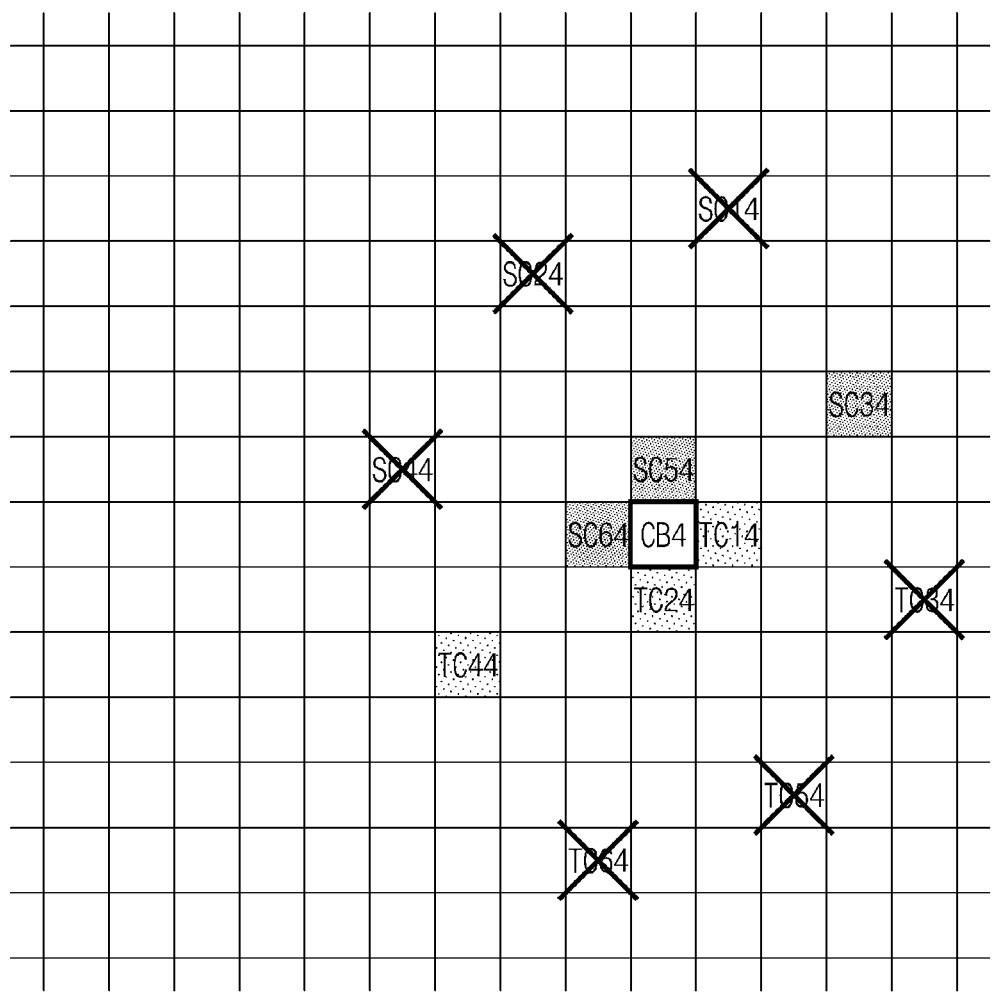

For example, FIG. 15A is associated with a recursion for the current block CB1, and FIG. 15B is associated with a recursion for the current block CB2. FIG. 15C is associated with a recursion for a current block CB3, and FIG. 15D is associated with a recursion for a current block CB4.

Referring to FIG. 15A, candidate blocks SC41 and TC31 may be selected and candidate blocks SC41, SC51, SC61, TC11, TC21, and TC31 may be used to generate a motion vector for the current block CB1. On the other hand, unselected candidate blocks SC11, SC21, SC31, SC41, TC51, and TC61 may not be used to generate the motion vector for the current block CB1.

Referring to FIG. 15B, after the motion vector for the current block CB1 is generated, candidate blocks SC22 and TC52 may be selected and candidate blocks SC22, SC52, SC62, TC12, TC22, and TC52 may be used to generate a motion vector for the current block CB2. On the other hand, unselected candidate blocks SC12, SC32, SC42, TC32, TC42, and TC62 may not be used to generate the motion vector for the current block CB2.

Referring to FIG. 15C, after the motion vector for the current block CB2 is generated, candidate blocks SC13 and TC63 may be selected and candidate blocks SC13, SC53, SC63, TC13, TC23, and TC63 may be used to generate a motion vector for the current block CB3. On the other hand, unselected candidate blocks SC23, SC33, SC43, TC33, TC43, and TC53 may not be used to generate the motion vector for the current block CB3.

Referring to FIG. 15D, after the motion vector for the current block CB3 is generated, candidate blocks SC34 and TC44 may be selected and candidate blocks SC34, SC54, SC64, TC14, TC24, and TC44 may be used to generate a motion vector for the current block CB4. On the other hand, unselected candidate blocks SC14, SC24, SC44, TC34, TC54, and TC64 may not be used to generate the motion vector for the current block CB4.

Returning to FIG. 14, for each recursion for blocks constituting an image, relative locations corresponding to the candidate blocks SC1 to SC4 and TC3 to TC6 may be continuously alternately selected, and only candidate motion vectors of candidate blocks corresponding to the selected relative locations may be referenced to generate a motion vector. Alternately selecting the relative locations corresponding to the candidate blocks SC1 to SC4 and TC3 to TC6 may be continued for all the blocks constituting the image.

Selecting relative locations of candidate blocks to be used for the motion estimation has been described with reference to FIG. 14 and FIGS. 15A to 15D. However, the example of FIG. 14 and FIGS. 15A to 15D may be changed or modified to determine relative locations of candidate blocks which are not to be used in the motion estimation.

For example, in a recursion of FIG. 15A, relative locations corresponding to the candidate blocks SC41 and TC31 may be excluded (or may be unselected) such that the candidate blocks SC41 and TC31 are not selected, and relative locations corresponding to the candidate blocks SC11, SC21, SC31, TC41, TC51, and TC61 may be selected such that the candidate blocks SC11, SC21, SC31, TC41, TC51, and TC61 are selected. Descriptions associated with recursions of FIGS. 15B to 15D will be omitted below for brevity.

Figure 16:
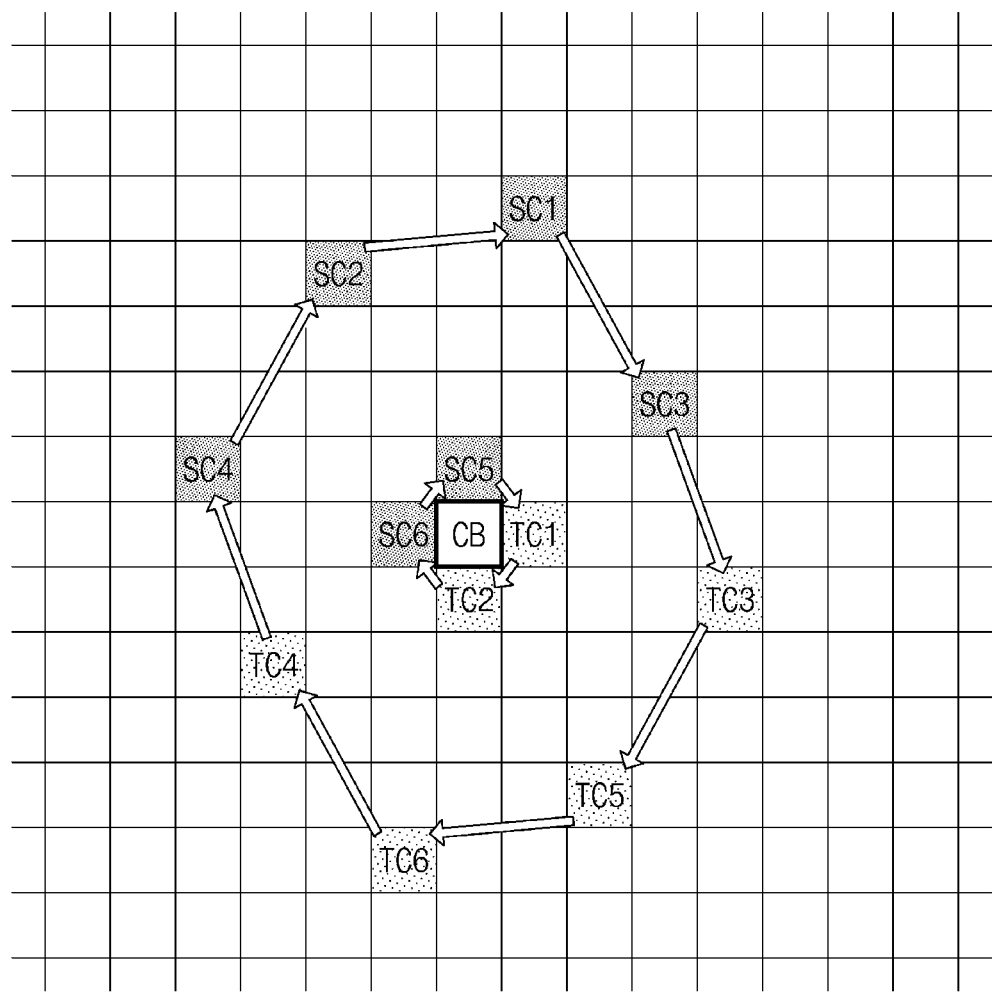

FIG. 16 is a conceptual diagram illustrating an example of selecting some of candidate blocks in motion estimation according to some example embodiments.

For example, for each recursion for blocks constituting an image, the candidate blocks SC1 to SC4 and TC3 to TC6 may be alternately selected (or may be alternately unselected), and the candidate blocks SC5, SC6, TC1, and TC2 may be alternately selected (or may be alternately unselected).

As described with reference to FIGS. 11 to 16, selected relative locations and unselected relative locations may be variously determined to be suitable for the motion estimation. However, the present disclosure is not limited to those described with reference to FIGS. 11 to 16, and example embodiments may select some of candidate blocks in various manners to decrease the number of candidate blocks referenced for the motion estimation.

Figure 17:
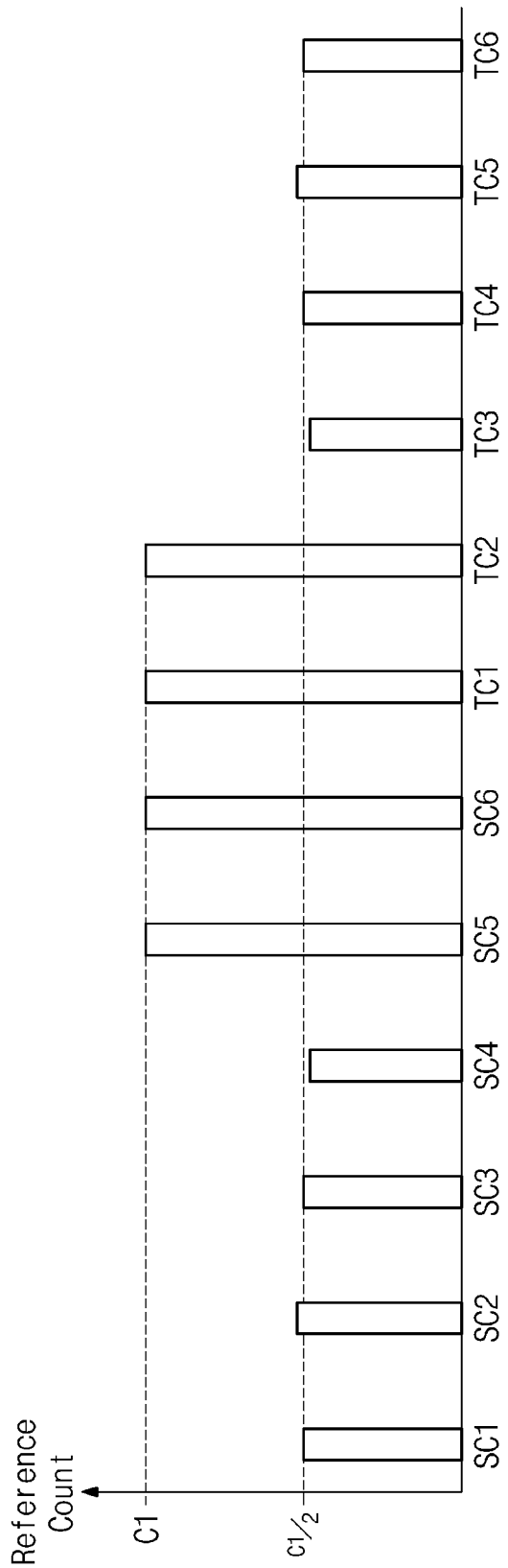
FIG. 17 is a graph for describing counts where candidate blocks are referenced according to some example embodiments.

FIG. 17 is a graph for describing counts where candidate blocks are referenced according to some example embodiments.

In some example embodiments, the motion estimation may differently select relative locations corresponding to candidate blocks for each recursion for blocks constituting an image, such that counts where all relative locations corresponding to all candidate blocks are selected during all recursions for the blocks constituting the image are equivalent (thus, such that counts where all the candidate blocks are selected during all the recursions for the blocks constituting the image are equivalent).

In these example embodiments, the motion estimation may differently select some of candidate blocks for each recursion for the blocks constituting the image and thus may differently determine candidate blocks to be used. To this end, the motion estimation may alternately select relative locations, which correspond to candidate blocks used in each recursion for the blocks constituting the image, from all the relative locations.

Herein, "equivalent" or "equivalence" may mean "accurately identical or uniform". In some cases, "equivalent" or "equivalence" may include "substantially the same or uniform with a slight difference within an allowable or negligible error".

FIG. 17 illustrates counts where the candidate blocks SC1 to SC6 and TC1 to TC6 are used during all the recursions for the blocks constituting the image with regard to the example of FIG. 13. With regard to the example of FIG. 13, the candidate blocks SC5, SC6, TC1, and TC2 may be used in all the recursions for the blocks constituting the image. For example, a count where each of the candidate blocks SC5, SC6, TC1, and TC2 is used may be "C1".

Meanwhile, with regard to the example of FIG. 13, the candidate blocks SC1 and SC3 may be alternately selected and the candidate blocks SC2 and SC4 may be alternately selected. In this case, a count where each of the candidate blocks SC1 and SC3 is used may be "C1/2". In some cases, a count where each of the candidate blocks SC2 and SC4 is used may be about "C1/2" with a slight difference.

In addition, the candidate blocks TC4 and TC6 may be alternately selected and a count where each of the candidate blocks TC4 and TC6 is used may be "C1/2". The candidate blocks TC3 and TC5 may be alternately selected, and a count where each of the candidate blocks TC3 and TC5 is used may be about "C1/2" with a slight difference.

In the same point of view, it may be understood that the motion estimation differently selects relative locations for each recursion for blocks constituting an image such that counts where all relative locations are excluded during all the recursions are equivalent.

In some example embodiments, selected relative locations and/or unselected relative locations may be elected in a sequential order. For example, with regard to the example of FIG. 13, the candidate blocks SC1 and SC3 may be alternately selected in a sequential order. In this case, counts where relative locations corresponding to the candidate blocks SC1 and SC3 are selected (or unselected) during all recursions for blocks constituting an image may become equivalent.

In some example embodiments, selected relative locations and/or unselected relative locations may be elected in a pseudo-random manner. For example, with regard to the example of FIG. 13, a candidate block selected from the candidate blocks SC2 and SC4 may be elected in a pseudo-random manner. In this case, a slight error may occur, but counts where relative locations corresponding to the candidate blocks SC2 and SC4 are selected (or unselected) during all recursions for blocks constituting an image may become almost equivalent.

For example, equivalently using candidate blocks which are selected alternately may be associated with accuracy of the motion estimation. For example, when counts where candidate blocks corresponding to specific relative locations are used are more than counts where other candidate blocks are used, it may be difficult to accurately estimate motions toward a current block from candidate motion vectors of candidate blocks which are less referenced. Even though the number of candidate blocks used for the motion estimation decreases, if candidate blocks which are alternately selected are used equivalently, accuracy of the motion estimation may not decrease or the decrease in the accuracy of the motion estimation may be minimized.

Figure 18:
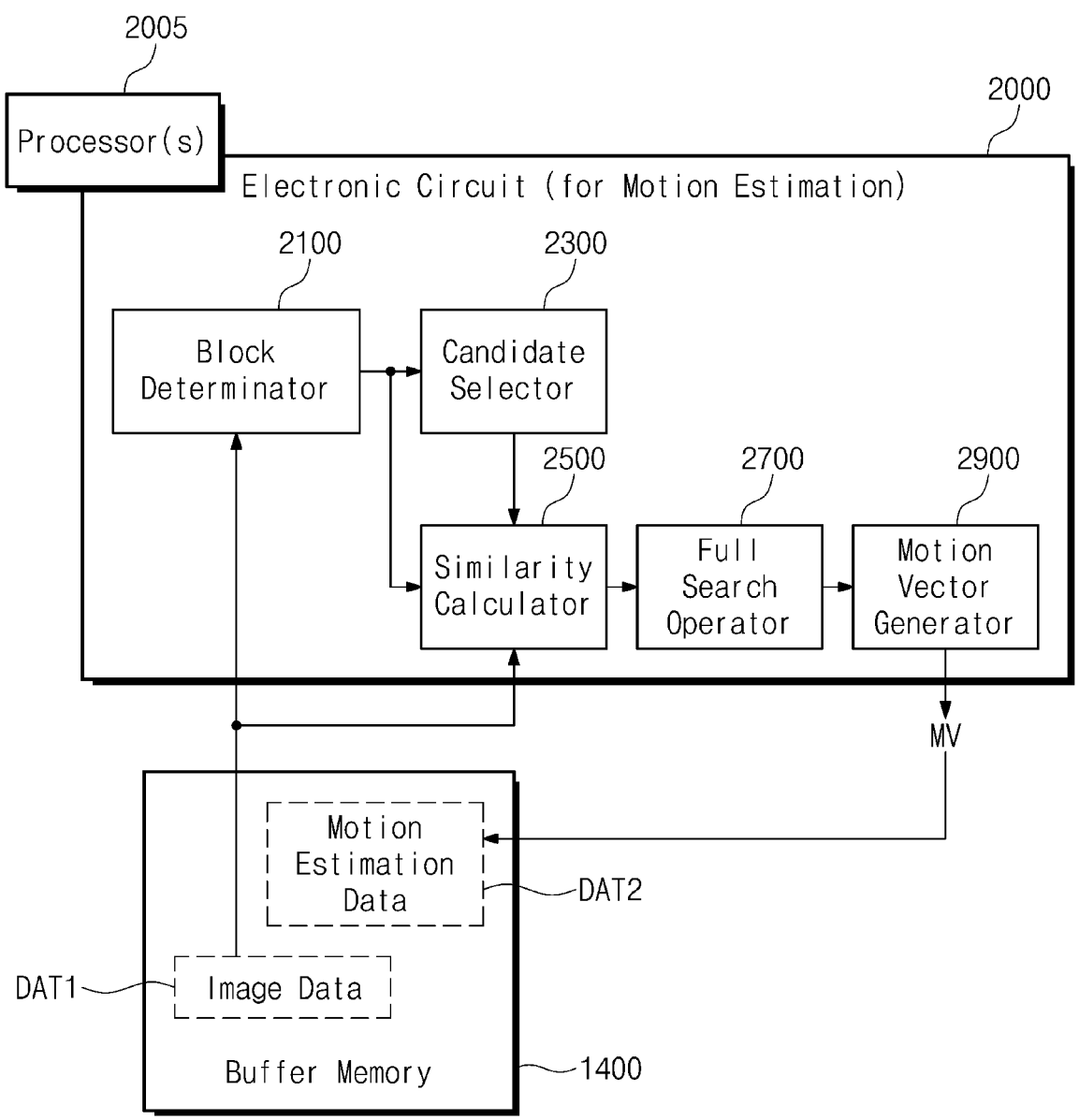
FIG. 18 is a block diagram illustrating an example configuration for performing motion estimation according to some example embodiments.
Figure 19:
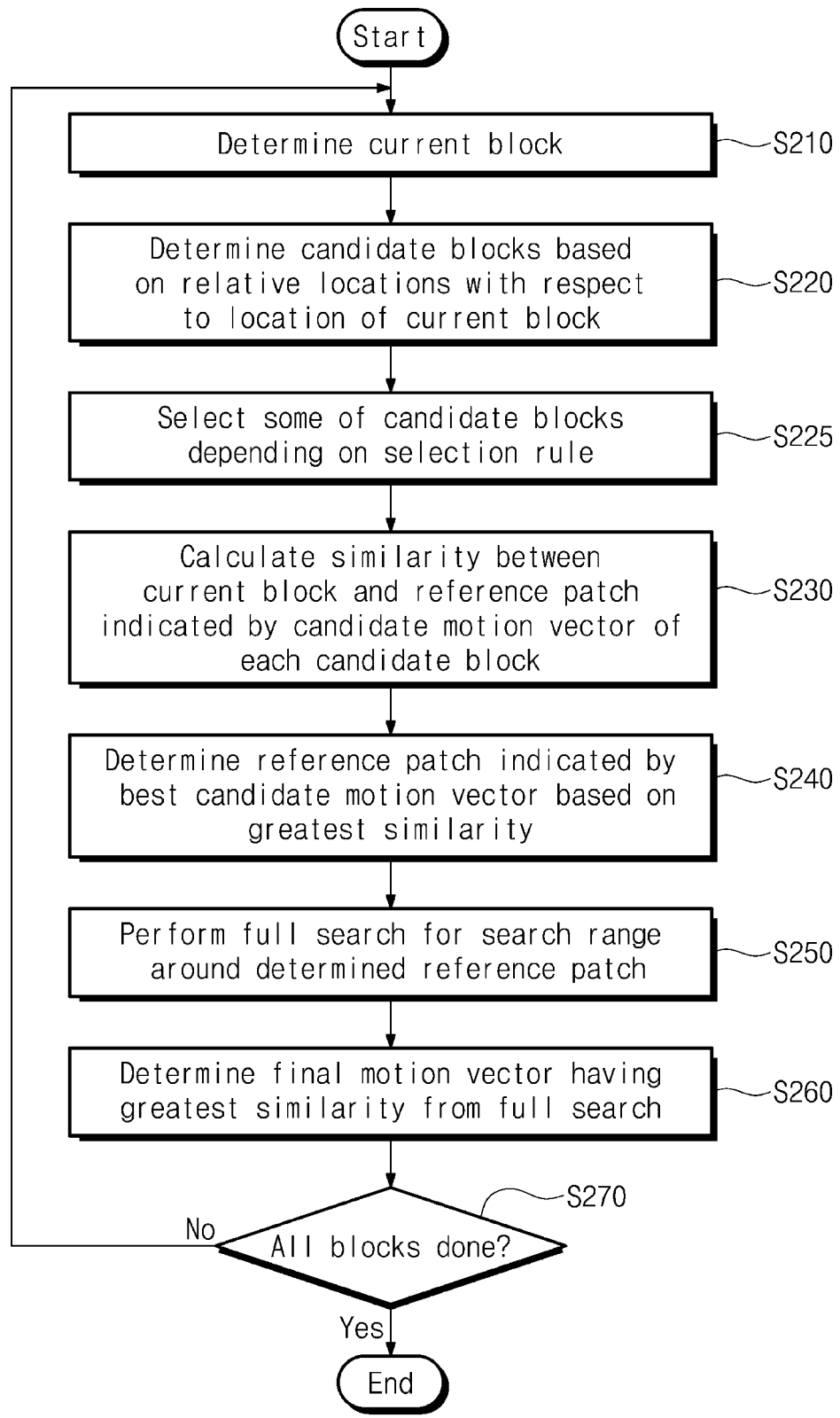
FIG. 19 is a flowchart describing example operations for performing motion estimation according to some example embodiments.

FIG. 18 is a block diagram illustrating an example configuration for performing motion estimation according to some example embodiments. FIG. 19 is a flowchart describing example operations for performing motion estimation according to some example embodiments.

Referring to FIG. 18, in some example embodiments, the electronic circuit 2000 may include a block determinator 2100, a candidate selector 2300, a similarity calculator 2500, a full search operator 2700, and a motion vector generator 2900. The block determinator 2100, the candidate selector 2300, the similarity calculator 2500, the full search operator 2700, and the motion vector generator 2900 may be implemented in hardware circuits configured to perform operations described in the present disclosure.

Additionally or alternatively, the block determinator 2100, the candidate selector 2300, the similarity calculator 2500, the full search operator 2700, and the motion vector generator 2900 may be implemented in software modules. As one or more processors (e.g., the main processor 1800, a separate processor(s) 2005 for the electronic circuit 2000, and/or the like) executes an instruction, operations of the block determinator 2100, the candidate selector 2300, the similarity calculator 2500, the full search operator 2700, and the motion vector generator 2900 may be caused.

The block determinator 2100 may determine a current block and candidate blocks based on the image data DAT1 (S210 and S220 of FIG. 19), which determinations may be substantially identical or similar to those described with reference to operation S110 and operation S120 of FIG. 4 and FIGS. 5A and 5B.

The candidate selector 2300 may select some of the candidate blocks determined by the block determinator 2100 (S225 of FIG. 19), which selection may be substantially identical or similar to those described with reference to FIGS. 11 to 17. For example, the candidate selector 2300 may select some of candidate blocks according to a selection rule. For example, the selection rule may include a sequential order, a pseudo-random manner, and/or the like, but the present disclosure is not limited thereto.

The similarity calculator 2500 may calculate a similarity between the current block determined by the block determinator 2100 and each of reference patches indicated by candidate motion vectors of the candidate blocks selected by the candidate selector 2300, based on the image data DAT1 (S230 of FIG. 19), which calculation may be substantially identical or similar to those described with reference to operation S130 of FIG. 4 and FIG. 6.

The similarity calculator 2500 may determine one reference patch indicated by the best candidate motion vector based on the greatest similarity (S240 of FIG. 19), which determination may be substantially identical or similar to those described with reference to operation S140 of FIG. 4.

The full search operator 2700 may perform a full search on a search area around the one reference patch determined by the similarity calculator 2500 (S250 of FIG. 19), which search may be substantially identical or similar to those described with reference to operation S150 of FIG. 4, and FIG. 7 and FIGS. 8A to 8C.

The motion vector generator 2900 may determine a final motion vector by determining a final reference patch within the search area based on a result of the full search of the full search operator 2700 (S260 of FIG. 19), which determination may be substantially identical or similar to those described with reference to operation S160 of FIG. 4, and FIG. 7 and FIGS. 8A to 8C.

The motion vector generator 2900 may generate a motion vector MV for the current block based on the final motion vector. Data of the motion vector MV may be stored in the buffer memory 1400 and/or the nonvolatile memory 1500 as motion estimation data DAT2. The motion estimation data DAT2 may be referenced to perform a function or an operation of the ISP 1130, the FRC 1730, the CODEC 1830, and/or another component.

Selecting some of candidate blocks and then using the selected candidate blocks has been described above. However, in some example embodiments, the electronic circuit 2000 may be changed or modified to select relative locations corresponding to candidate blocks to be used and then determine only candidate blocks corresponding to the selected relative locations. In this case, configurations and operations of the block determinator 2100 and the candidate selector 2300 may be suitably changed or modified.

When motion vectors are not yet generated with regard to all the blocks constituting the image of the current frame (No of operation S270 of FIG. 19), operation S210 to operation S260 may be performed on a block where a motion vector is not generated. To this end, the block determinator 2100 may newly determine a current block such that a current location on the image of the current frame moves to correspond to the block where a motion vector is not generated. After motion vectors for all blocks constituting the image of the current frame are generated (Yes of S270 of FIG. 19), recursions for the blocks constituting the image may be completed.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The above descriptions are intended to provide example configurations and operations for implementing the present disclosure. The present disclosure may include implementations which may be obtained by simply changing or modifying the above example embodiments, in addition to the above-described example embodiments. Also, the present disclosure may include implementations which may be accomplished by easily changing or modifying the above-described example embodiments in the future.

What is claimed is:

1. An electronic circuit to perform motion estimation between images, the electronic circuit comprising:
a block determinator to determine a current block and candidate blocks for each recursion for blocks constituting an image, the current block corresponding to a current location on the image, the candidate blocks corresponding to relative locations with respect to the current location;
a candidate selector to select some of the candidate blocks as selected candidate blocks; and
a motion vector generator to generate a motion vector for the current block based on one reference patch, the one reference patch being determined from reference patches which are indicated by candidate motion vectors of the selected candidate blocks, wherein
at least one of the relative locations corresponding to the candidate blocks selected in a first recursion among recursions for the blocks constituting the image is different from each of the relative locations corresponding to the candidate blocks selected in a second recursion following the first recursion.

2. The electronic circuit of claim 1, wherein the block determinator determines the current block such that the current location on the image moves to correspond to a block where a motion vector is not generated for each recursion for the blocks constituting the image.

3. The electronic circuit of claim 2, wherein the block determinator determines the candidate blocks such that a coordinate relationship between the moved current location and the relative locations does not change for each recursion for the blocks constituting the image.

4. The electronic circuit of claim 1, further comprising:
a similarity calculator to calculate a similarity between the current block and each of the reference patches, wherein
a similarity calculated with regard to the one reference patch is a greatest similarity among similarities calculated with regard to the reference patches.

5. The electronic circuit of claim 4, wherein the similarity between the current block and each of the reference patches is calculated based on a sum of differences between pixel values of the current block and pixel values of each of the reference patches.

6. The electronic circuit of claim 1, wherein the motion vector generator:
determines a final reference patch based on a similarity between first pixels in addition to second pixels and third pixels, the first pixels constituting the one reference patch, the second pixels being determined based on locations of the first pixels on the image, the third pixels constituting a current image, and
obtains the motion vector for the current block from a final motion vector indicating the final reference patch.

7. The electronic circuit of claim 1, wherein
with regard to a relative location corresponding to a first candidate block selected in the first recursion, a candidate block is not selected in the second recursion.

8. The electronic circuit of claim 1, wherein
with regard to a relative location corresponding to a candidate block which is not selected in the first recursion, a second candidate block is selected in the second recursion.

9. The electronic circuit of claim 1, wherein the candidate selector differently selects some of the candidate blocks for each recursion for the blocks constituting the image such that counts where the candidate blocks are selected during all recursions for the blocks constituting the image are equivalent.

10. An electronic device comprising:
a memory to store first data of a first image; and
an electronic circuit to generate a motion vector for a current block corresponding to a first location on the first image, by using candidate blocks corresponding to relative locations with respect to the first location, for each recursion for blocks constituting the first image, wherein
the electronic circuit uses the candidate blocks such that the relative locations corresponding to the candidate blocks which are used in each recursion for the blocks constituting the first image are alternately selected from all relative locations corresponding to all candidate blocks which are used during all recursions for the blocks constituting the first image.

11. The electronic device of claim 10, wherein
a first number of the relative locations corresponding to the candidate blocks which are used in each recursion for the blocks constituting the first image is less than a second number of the all relative locations.

12. The electronic device of claim 10, wherein
for each recursion for the blocks constituting the first image, at least one of the relative locations corresponding to the candidate blocks used to generate the motion vector changes.

13. The electronic device of claim 10, wherein the electronic circuit differently selects first relative locations, among the all relative locations, for each recursion for the blocks constituting the first image such that counts of the first relative locations during the all recursions are equivalent.

14. The electronic device of claim 10, wherein the electronic circuit excludes at least one relative location among the all relative locations such that at least one of candidate blocks corresponding to the all relative locations is not used for each recursion for the blocks constituting the first image.

15. The electronic device of claim 14, wherein the electronic circuit differently selects the relative locations for each recursion for the blocks constituting the first image such that counts where the all relative locations are excluded during the all recursions are equivalent.

16. The electronic device of claim 14, wherein the electronic circuit selects the at least one relative location from the all relative locations in a sequential order or in a pseudo-random manner.

17. The electronic device of claim 14, wherein the at least one relative location includes a relative location, which corresponds to a coordinate not adjacent to the first location on the first image, among the all relative locations.

18. The electronic device of claim 10, wherein
for each recursion for the blocks constituting the first image, the relative locations corresponding to the used candidate blocks include relative locations, which correspond to coordinates adjacent to the first location on the first image, among the all relative locations.

19. The electronic device of claim 10, wherein:
the memory further stores second data of a second image which is provided as a previous frame of the first image,
the used candidate blocks include first candidate blocks where motion vectors have already been generated and second candidate blocks where motion vectors are not yet generated, and
the electronic circuit uses the first candidate blocks based on the first data and uses the second candidate blocks based on the second data.

20. The electronic device of claim 10, wherein for each recursion for the blocks constituting the first image, the electronic circuit obtains the motion vector from a second location which corresponds to a final reference block determined based on the used candidate blocks.

* * * * *